US012812357B2

(12) United States Patent
Lee et al.

(10) Patent No.: US 12,812,357 B2
(45) Date of Patent: Nov. 24, 2026

(54) ELECTRONIC DEVICE PERFORMING VERIFICATION USING EMBEDDED SIM AND OPERATING METHOD THEREFOR

(71) Applicant: Samsung Electronics Co., Ltd., Suwon-si (KR)

(72) Inventors: Sanghwi Lee, Suwon-si (KR); Youcheol Moon, Suwon-si (KR); Seungmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 275 days.

(21) Appl. No.: 18/340,410

(22) Filed: Jun. 23, 2023

(65) Prior Publication Data

US 2023/0336970 A1 Oct. 19, 2023

Related U.S. Application Data

(63) Continuation of application No. PCT/KR2021/019648, filed on Dec. 22, 2021.

(30) Foreign Application Priority Data

Dec. 23, 2020 (KR) ........................ 10-2020-0181643

(51) Int. Cl.
*H04W 8/18* (2009.01)
*H04W 8/22* (2009.01)

(52) U.S. Cl.
CPC ............. *H04W 8/183* (2013.01); *H04W 8/22* (2013.01)

(58) Field of Classification Search
CPC .... H04L 67/303; H04W 24/06; H04W 8/183; H04W 8/205; H04W 8/22
See application file for complete search history.

(56) References Cited

U.S. PATENT DOCUMENTS 10,708,761 B1 7/2020 Yin et al.
10,791,459 B1 9/2020 Hu et al.
(Continued)

FOREIGN PATENT DOCUMENTS

CN 108990047 A 12/2018
CN 110113779 A 8/2019
(Continued)

OTHER PUBLICATIONS

Extended European Search Report dated May 31, 2024, issued in European Patent Application No. 21911547.4.
(Continued)

*Primary Examiner* — Zhensheng Zhang
(74) *Attorney, Agent, or Firm* — Jefferson IP Law, LLP

(57) ABSTRACT

An electronic device is provided. The electronic device includes at least one processor and at least one embedded subscriber identity module (eSIM), wherein the at least one processor can be set to check an eSIM for testing among the at least one eSIM, obtain a profile for writing to the eSIM from a memory of the electronic device and/or an external device different from a SM-DP+ server, write the profile to the eSIM, activate the profile, perform an operation for associating, with the eSIM, a protocol stack corresponding to a port for testing among a plurality of ports associated with the at least one processor, perform a test operation using the profile and the protocol stack associated with the eSIM, upon completion of the performance of the test operation, deactivate the profile, and delete the profile.

18 Claims, 16 Drawing Sheets

(56) References Cited

U.S. PATENT DOCUMENTS

| | | | | |
|---|---|---|---|---|
| 2008/0071940 | A1 | 3/2008 | Kim et al. | |
| 2016/0020802 | A1 | 1/2016 | Lee et al. | |
| 2016/0286379 | A1* | 9/2016 | Li | H04W 8/02 |
| 2017/0134298 | A1 | 5/2017 | Walke | |
| 2018/0351945 | A1 | 12/2018 | Li et al. | |
| 2019/0007835 | A1* | 1/2019 | Li | H04W 12/069 |
| 2020/0389783 | A1 | 12/2020 | Kang et al. | |
| 2022/0174474 | A1* | 6/2022 | Uy | H04W 60/04 |

FOREIGN PATENT DOCUMENTS

| | | | |
|---|---|---|---|
| CN | 111372249 | A | 7/2020 |
| EP | 2 448 301 | A1 | 5/2012 |
| JP | 2019-145910 | A | 8/2019 |
| KR | 10-0764744 | B1 | 10/2007 |
| KR | 10-2016-0010239 | A | 1/2016 |
| KR | 10-2018-0080226 | A | 7/2018 |
| KR | 10-2020-0140555 | A | 12/2020 |
| KR | 10-2021-0101658 | A | 8/2021 |
| WO | 2017/172604 | A1 | 10/2017 |

OTHER PUBLICATIONS

International Search Report dated Apr. 4, 2022, issued in International Patent Application No. PCT/KR2021/019648.

Korean Office Action dated Sep. 30, 2025, issued in Korean Patent Application No. 10-2020-0181643.

* cited by examiner

ELECTRONIC DEVICE PERFORMING VERIFICATION USING EMBEDDED SIM AND OPERATING METHOD THEREFOR

CROSS-REFERENCE TO RELATED APPLICATION(S)

This application is a continuation application, claiming priority under § 365(c), of an International application No. PCT/KR2021/019648, filed on Dec. 22, 2021, which is based on and claims the benefit of a Korean patent application number 10-2020-0181643, filed on Dec. 23, 2020, in the Korean Intellectual Property Office, the disclosure of which is incorporated by reference herein in its entirety.

BACKGROUND

1. Field

The disclosure relates to an electronic device for performing verification using an embedded subscriber identity module (eSIM), and a method of operating the same.

2. Description of Related Art

A universal integrated circuit card (UICC) is a smart card inserted into a mobile communication terminal, for use, and also called a UICC card. The UICC may include an access control module for accessing a network of a mobile communication operator. Examples of the access control module include a universal subscriber identity module (USIM), a subscriber identity module (SIM), an internet protocol (IP) multimedia service identity module (ISIM), and the like. A UICC including a USIM is also commonly referred to as a USIM card. A UICC including a SIM is also commonly referred to as a SIM card. In the following description of the disclosure, a SIM will generically refer to a UICC including a UICC card, a USIM card, an ISIM, or the like.

For example, the SIM stores personal information about a mobile communication subscriber, and enables safe use of mobile communication by performing subscriber authentication and generating a traffic security key during access to a mobile communication network.

Generally, the SIM is manufactured as a dedicated card for a specific mobile communication operator at a request of an operator during card manufacturing, and authentication information for network access of the operator, for example, a USIM application, an international mobile subscriber identity (IMSI), a K value, an OPc value, and so on are pre-loaded on the card before shipment. The manufactured SIM is delivered to a subscriber by the mobile communication operator, and then, management such as installation, modification, and deletion of applications in the UICC may be performed by technologies such as over the air (OTA), when needed. The subscriber may use network and application services of the mobile communication operator by inserting the UICC card into a mobile communication terminal owned by the subscriber. When a terminal is replaced with a new one, the UICC card may be moved and inserted from the old terminal to the new terminal, so that authentication information, mobile communication phone numbers, a personal phone book, and so on may still be used in the new terminal.

Nevertheless, the SIM card is inconvenient for the user of the mobile communication terminal to receive services from other mobile communication companies. To receive a service from a mobile communication operator, the user of the mobile communication terminal should physically obtain a SIM. In an example, when the user travels to another country, the user should inconveniently obtain a local SIM to receive a local mobile communication service. Although a roaming service may relieve the inconvenience to some extent, the roam service is expensive, and may not be viable without a contract between telecommunication companies.

When the SIM module is remotely downloaded and installed on the UICC card, this inconvenience may be greatly overcome. A SIM module of a mobile communication service to be used may be downloaded to the UICC card at a user-desired time. Additionally, a plurality of SIM modules may be downloaded and installed on the UICC card, and only one of the SIM modules may be selected and used. This UICC card may or may not be fixed to the terminal. Particularly, a UICC fixed to a terminal is called an embedded UICC (eUICC) (or eSIM). An eSIM refers to a UICC card that is fixed to a terminal and may remotely download and select a SIM module. In the disclosure, a UICC card that may remotely download and select a SIM module will be collectively referred to as an eSIM. Among UICC cards that may download and select a SIM module remotely, a UICC card fixed to a terminal and a UICC card that is not fixed to a terminal are collectively referred to as an eUICC. In addition, downloaded SIM module information will be collectively referred to as a profile.

The above information is presented as background information only to assist with an understanding of the disclosure. No determination has been made, and no assertion is made, as to whether any of the above might be applicable as prior art with regard to the disclosure.

SUMMARY

Before an electronic device is released from a factory, a verification operation should be performed to determine whether a communication function or a function related to the communication function is executed normally. For the verification operation associated with the communication function, a SIM needs to be inserted into a slot of the electronic device. Although an act of inserting a physical SIM into a slot or an act of removing the SIM from the slot after completion of the verification operation should be performed by manpower, this is inefficient and requires a lot of resources, especially in case of mass verification. Alternatively, a mechanical device for inserting/removing a SIM may be manufactured. Nevertheless, a different mechanical device needs to be manufactured for each model of an electronic device, and a test SIM may need to be replaced, when SIM failure occurs.

Aspects of the disclosure are to address at least the above-mentioned problems and/or disadvantages and to provide at least the advantages described below. Accordingly, an aspect of the disclosure is to provide an electronic device and a method of operating the same that writes a locally available profile to an eSIM and perform a verification operation associated with each of a plurality of slots, using the profile.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor and at least one eSIM. The at least one processor is configured to identify an eSIM for a test among the at least one eSIM, obtain a profile to be written to the eSIM from memory of the electronic device and/or an external device other than an SM-DP+ server, write the profile to the eSIM, enable the profile, perform an operation of associating a protocol stack corresponding to a port for the test among a plurality of ports associated with the at least one processor with the eSIM, perform a test operation using the profile and the protocol stack associated with the eSIM, and disable the profile and delete the profile, based on completion of the test operation.

In accordance with another aspect of the disclosure, a method of operating an electronic device including at least one eSIM is provided. The method includes identifying an eSIM for a test among the at least one eSIM, obtaining a profile to be written to the eSIM from memory of the electronic device and/or an external device other than an SM-DP+ server, writing the profile to the eSIM, enabling the profile, performing an operation of associating a protocol stack corresponding to a port for the test among a plurality of ports associated with the at least one processor with the eSIM, performing a test operation using the profile and the protocol stack associated with the eSIM, and disabling the profile and deleting the profile, based on completion of the test operation.

In accordance with another aspect of the disclosure, an electronic device is provided. The electronic device includes at least one processor and at least one eSIM. The at least one processor is configured to identify an eSIM for a test among the at least one eSIM, obtain a profile to be written to the eSIM from an SM-DP+ server, write the profile to the eSIM, enable the profile, perform an operation of associating a protocol stack corresponding to a port for the test among a plurality of ports associated with the at least one processor with the eSIM, perform a test operation using the profile and the protocol stack associated with the eSIM, and disable the profile and delete the profile, based on completion of the test operation.

According to various embodiments, an electronic device and a method of operating the same may be provided, in which a locally available profile may be written to an eSIM, and a verification operation associated with each of a plurality of slots may be performed using the profile. Accordingly, a verification operation related to a communication function may be performed without inserting/removing a SIM directly into/from a slot.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
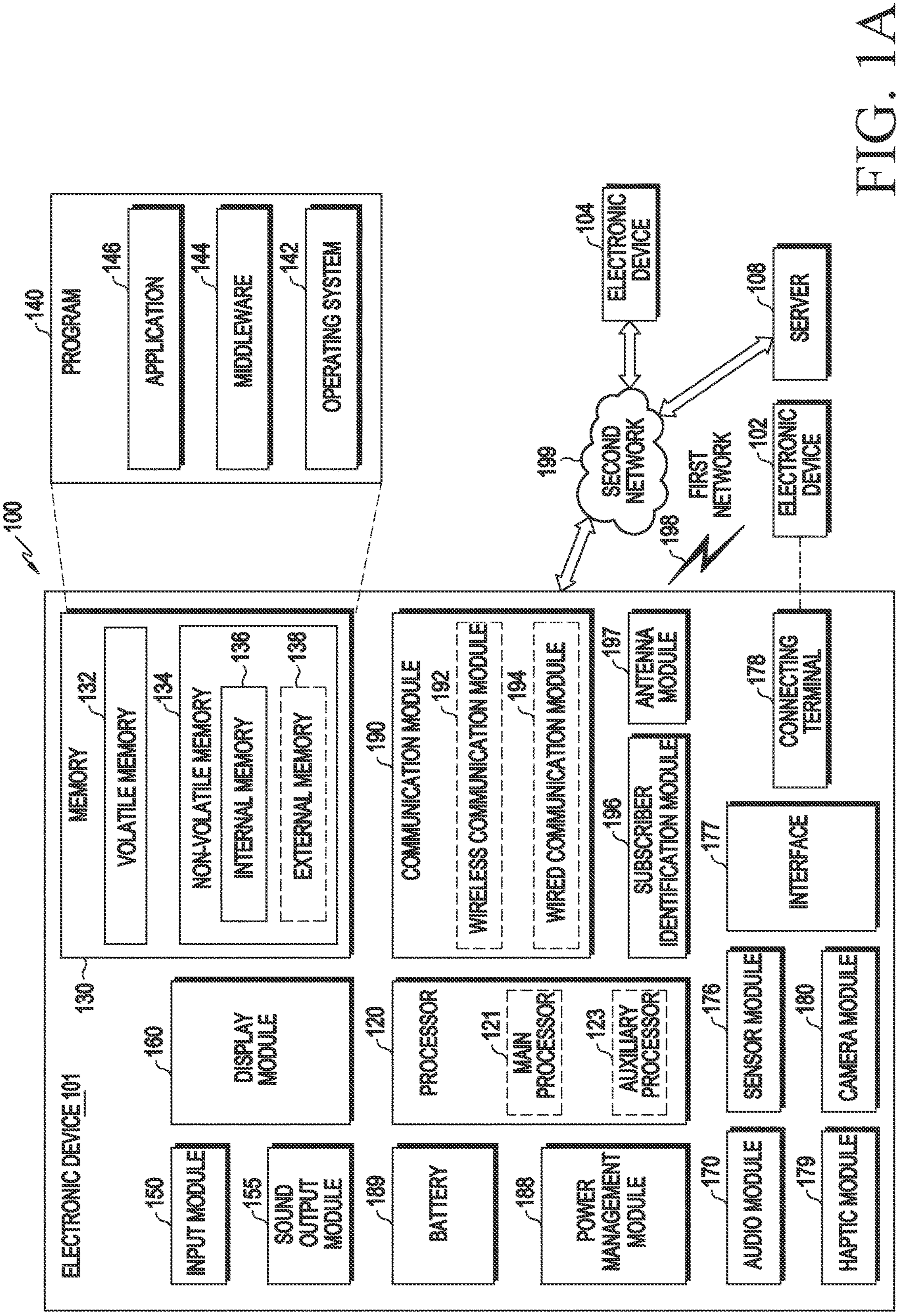
FIG. 1A is a block diagram illustrating an electronic device in a networked environment according to an embodiment of the disclosure.

FIG. 1A is a block diagram illustrating an electronic device 101 in a network environment 100 according to an embodiment of the disclosure.

Referring to FIG. 1A, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to one embodiment, the electronic device 101 may communicate with the electronic device 104 via the server 108. According to another embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components (e.g., the display device 160 or the camera module 180) may be omitted from the electronic device 101, or one or more other components may be added in the electronic device 101. In various embodiments, some of the components may be implemented as a single integrated circuit. In an example, the sensor module 176 (e.g., a fingerprint sensor, an iris sensor, an illuminance sensor) may be implemented embedded in the display 160 (e.g., a display).

The processor 120 may be configured to execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)) and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be configured to consume less power than the main processor 121, or to be specific to a specified function. The auxiliary processor 123 may be implemented as separate from, or as part of the main processor 121.

The auxiliary processor 123 may be configured to control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. In another embodiment, the memory 130 may include the volatile memory 132 or the non-volatile memory 134.

The program 140 may be stored in the memory 130 as software, and may include, for example, an operating system (OS) 142, middleware 144, or an application 146.

The input device 150 may, for example, receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

In an embodiment, the sound output device 155 may output sound signals to the outside of the electronic device 101. The sound output device 155 may include, for example, a speaker or a receiver. The speaker may be used for general purposes, such as playing multimedia or playing record, and the receiver may be used for receiving incoming calls. In another embodiment, the receiver may be implemented as separate from, or as part of the speaker.

The display device 160 may visually provide information to the outside (e.g., a user) of the electronic device 101. In another embodiment, the display device 160 may include, for example, a display, a hologram device, or a projector and control circuitry to control a corresponding one of the display, hologram device, and projector. According to yet another embodiment, the display device 160 may include touch circuitry adapted to detect a touch, or a sensor circuit (e.g., a pressure sensor) adapted to measure the intensity of force incurred by a touch.

The audio module 170 may convert a sound into an electrical signal and vice versa. According to another embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to still another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. In another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). In an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. In another embodiment, the haptic module 179 may include, for example, a motor, a piezoelectric element, or an electric stimulator.

The camera module 180 may capture a still image or moving images. In yet another embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. In an embodiment, the communication module 190 may include one or more communication processors that are operable independently from the processor 120 (e.g., the application processor (AP)) and supports a direct (e.g., wired) communication or a wireless communication. In another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, the Internet, or a computer network (e.g., LAN or wide area network (WAN)). These various types of communication modules may be implemented as a single component (e.g., a single chip), or may be implemented as multi components (e.g., multi chips) separate from each other. In yet another embodiment, the wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to one embodiment, the antenna module 197 may include an antenna including a radiating element composed of a conductive material or a conductive pattern formed in or on a substrate (e.g., a printed circuit board (PCB)). According to another embodiment, the antenna module 197 may include one or more antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the one or more antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), mobile industry processor interface (MIPI), and the like).

According to one embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to another embodiment, all or some of operations to be executed at the electronic device 101 may be executed at one or more of the external electronic devices 102, 104, or 108. In an example, if the electronic device 101 should perform a function or a service automatically, or in response to a request from a user or another device, the electronic device 101, instead of, or in addition to, executing the function or the service, may request the one or more external electronic devices to perform at least part of the function or the service. According to yet another embodiment, the one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 1B:
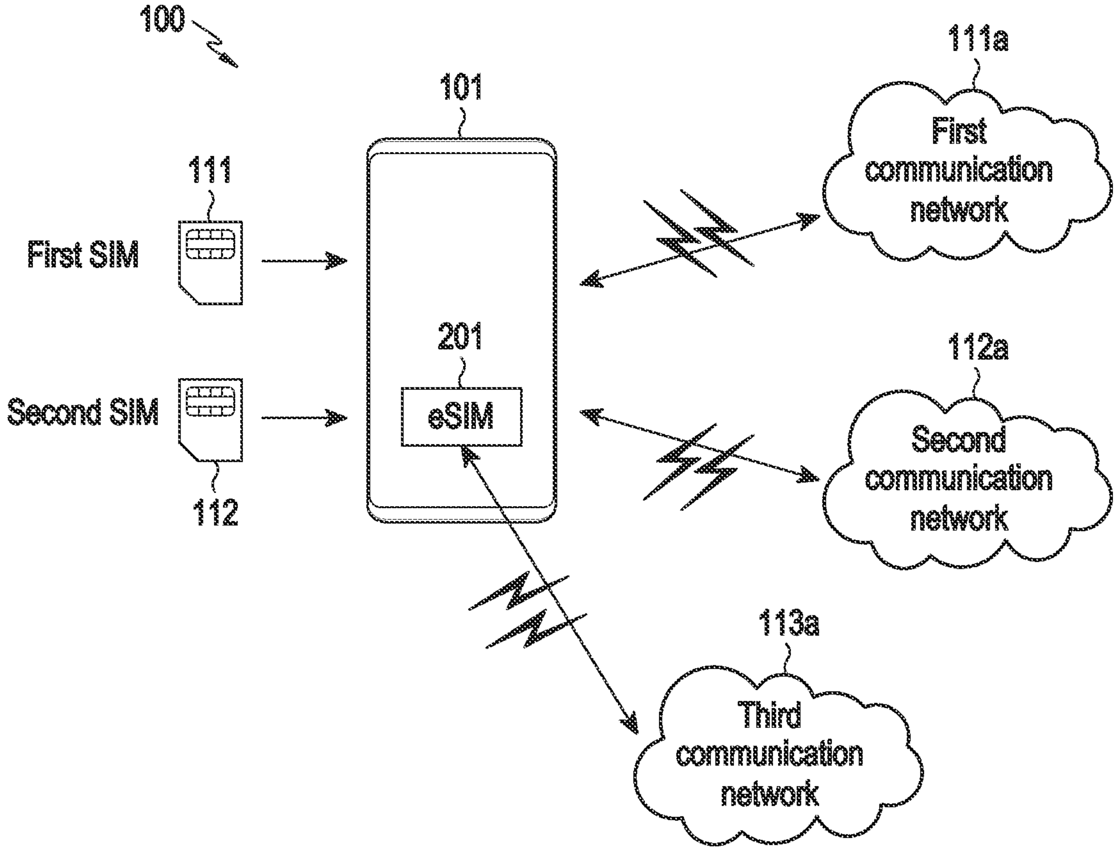
FIG. 1B is a diagram illustrating a network environment including an electronic device according to an embodiment of the disclosure.

FIG. 1B is a diagram illustrating the network environment 100 including an electronic device according to an embodiment of the disclosure.

Referring to FIG. 1B, a network 100 according to various embodiments of the disclosure may include an electronic device 101, a first communication network 111*a*, a second communication network 112*a*, or a third communication network 113*a*.

According to some embodiments, the electronic device 101 may operate as a dual SIM dual standby (DSDS) or dual SIM dual active (DSDA) electronic device supporting a plurality of SIMs in a single device. In an example, the two SIMs of a first SIM 111 and a second SIM 112 may be installed in the electronic device 101. The first SIM 111 and the second SIM 112 may be removable SIMs (rSIMs). An rSIM may refer to a SIM detachably provided in a slot in the electronic device 101, and its shape/standard is not limited.

In another example, two SIM cards may be installed in the electronic device 101 to support the two SIMs. For convenience of description, a SIM card will be referred to as a SIM. As illustrated in FIG. 1B, the two SIM cards of the first SIM 111 and the second SIM 112 may be mounted in the electronic device 101. The electronic device 101 may include a first slot (not shown) and a second slot (not shown) as first structures therein to accommodate the first SIM 111 and the second SIM 112, respectively.

The first SIM 111 is a SIM subscribed to a communication service provider of the first communication network 111*a*, and the electronic device 101 may receive a wireless communication service by accessing the first communication network 111*a* using the first SIM 111. In another example, the second SIM 112 is a SIM subscribed to a communication service provider of the second communication network 112*a*, and the electronic device 101 may receive a wireless communication service by accessing the second communication network 112*a* using the second SIM 112. According to some embodiments, the electronic device 101 may include an embedded subscriber identity module (eSIM) 201. An eSIM may also be called an eUICC. The electronic device 101 may receive a wireless communication service by accessing the third communication network 113*a* using the eSIM 201. At least some of the first communication network 111*a*, the second communication network 112*a*, or the third communication network 113*a* may be provided by the same communication service provider or different communication service providers.

Figure 2:
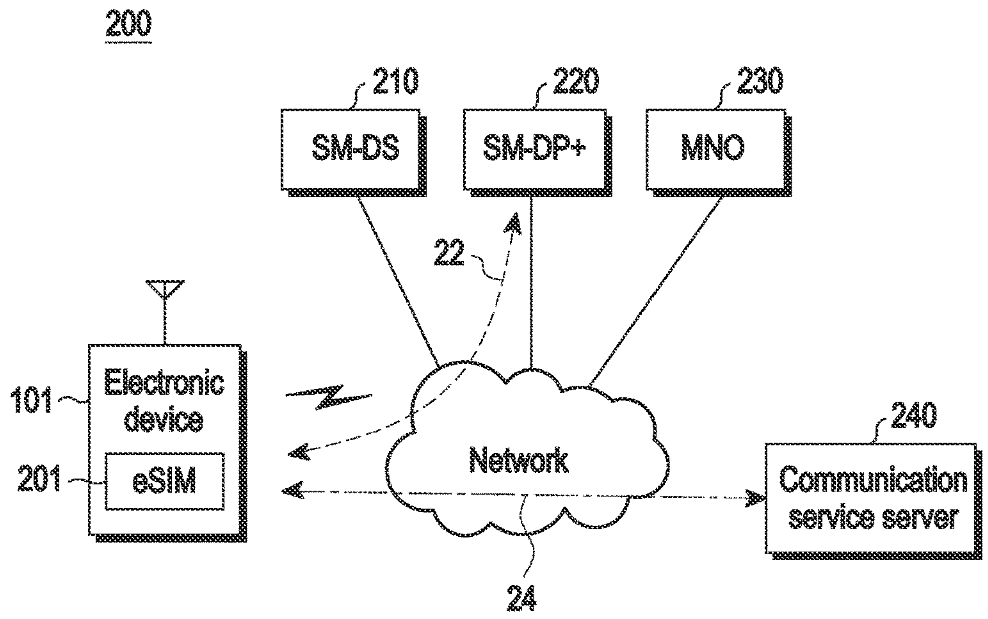
FIG. 2 is a diagram illustrating a system for providing a profile-based communication connection to an electronic device according to an embodiment of the disclosure.

FIG. 2 is a diagram illustrating a system for providing a profile-based communication connection to an electronic device according to an embodiment of the disclosure.

Referring to FIG. 2, a system 200 according to various embodiments may include an electronic device 101, a subscription manager discovery service (SM-DS) server 210, a subscription manager data preparation plus (SM-DP+) server 220, a mobile network operator (MNO) server 230, and a communication service server 240.

According to an embodiment, the electronic device 101 (e.g., the electronic device 101 of FIG. 1A) may include the eSIM 201. While not shown for convenience of description, the electronic device 101 may include two or more slots to accommodate two or more rSIMs therein. The electronic device 101 may be implemented to include one slot to accommodate two eSIMs and one rSIM therein. According to another embodiment, the electronic device 101 may include or accommodate N (N is a natural number) SIMs (eSIMs or rSIMs), and perform switching to use some of the SIMs. Combinations of N SIMs are not limited, and the number of SIMs is not limited either.

According to yet another embodiment, the eSIM 201 may be inserted into the electronic device 101, integrally provided with the electronic device 101, or implemented to be accessible by the electronic device 101. According to still another embodiment, the eSIM 201 may enable the electronic device 101 to perform authentication with a server of an MNO, using information (e.g., a profile including universal subscriber identity module (USIM) information) in the eSIM 201. In an embodiment, the eSIM 201 may be called a subscriber identity module (SIM) card in global system for mobile communications (GSM), and a USIM card in wideband code division multiple access (WCDMA), long term evolution (LTE), and new radio (NR). Besides, the eSIM 201 may be called various names according to communication schemes. For example, when a user of the electronic device 101 subscribes to a wireless communication service provided by a communication operator, the electronic device 101 may allow the user to use a wireless communication service after performing an appropriate authentication process with a server of the communication operator, which stores the same K value, using information in the eSIM 201, for example, an international mobile subscriber identity (IMSI) value and the K value which is an encryption key for authentication. In another example, the appropriate authentication process may be authentication and key agreement (AKA) authentication, and other authentication methods may also be available.

According to some embodiments, the eSIM 201 may be manufactured as a dedicated card for a specific communication operator at the request of the communication operator, and authentication information (e.g., a USIM application and a subscriber ID (e.g., IMSI)) and an encryption key (e.g., a known K value or Ki value) may be pre-loaded in the eSIM 201. Applications (or information) within the eSIM 201 may be installed, modified, deleted, or updated using a technology such as over the air (OTA), when needed. As described later in more detail, the electronic device 101 may obtain a profile for testing and write the profile to the eSIM 201. In an example, the electronic device 101 may write a profile stored therein or generated by an algorithm stored therein to the eSIM 201. In another example, the electronic device 101 may receive a profile which is stored or generated in an external device (not shown) other than the SM-DP+ server 220, wiredly or wirelessly, and write the profile to the eSIM 201. The electronic device 101 may receive a profile for testing from the SM-DP+ server 220 and write it to the eSIM 201.

According to an embodiment, the eSIM 201 may download or/and store information for providing a communication service in the form of a profile. According to another embodiment, the profile may be installed or stored in the process of manufacturing the eSIM 201, or may be downloaded in an OTA manner and installed or stored in the eSIM 201 by a user equipment (UE). For example, the profile may include a provisioning profile and an operational profile. Even when the provisioning profile is not installed, the electronic device 101 may download the operational profile through a Wi-Fi short-range connection or Internet connection, and those skilled in the art will understand that the provisioning profile does not need to be necessarily installed in the electronic device 101. In another example, the operational profile may be a profile including subscriber identification information about the user of the electronic device, and the provisioning profile may include information (hereinbelow, referred to as “first information”) for downloading subscriber identification information (hereinbelow, referred to as “first subscriber identification information”) or a profile (hereinbelow, referred to as a “first operational profile”) including the subscriber identification information. The electronic device may download the first operational profile based on the first information in the provisioning profile in the eSIM 201. Alternatively, the electronic device 101 may internally store or generate a profile for testing. Additionally, the electronic device 101 may receive a profile for testing from an external device other than the SM-DP+ server 220. The electronic device 101 may receive the profile for testing from the SM-DP+ server 220.

In an embodiment, the electronic device 101 may receive a communication service, using subscriber identification information (hereinafter, referred to as “second subscriber identification information”) of the operational profile (hereinafter, referred to as “second operational profile”) installed or stored in the eSIM 201. In an example, a profile including subscriber identification information may be a SIM profile.

In another embodiment, in addition to the subscriber identification information, the operational profile may further include network access authentication information about a subscriber, a phone book of the subscriber, personal information (e.g., short message service (SMS)) about the subscriber, the name of a subscribed communication operator, an available service, an available data amount, a rate or a service providing speed, or information enabling safe use of wireless communication by performing subscriber authentication and traffic security key generation during access to a wireless communication network such as GSM, WCDMA, LTE, NR, and the like.

In still another embodiment, the first information for downloading data (e.g., the first operational profile) including the first subscriber identification information may include communication session information for a first communication connection specified for downloading the first operational profile. In an example, the communication session information may include access information about the SM-DS server 210 or available communication operator network information for accessing the SM-DS server, to download the first operational profile.

In yet another embodiment, the SM-DS server 210 may provide the electronic device 101 with an address of the SM-DP+ server 220 from which the first operational profile may be downloaded based on the provisioning profile.

According to some embodiments, the SM-DP+ server 220 may be a profile providing server, an off-card entity of a profile domain, a profile encryption server, a profile creation server, a profile provisioner, or a profile provider. The SM-DP+ server 220 may establish a first communication connection 22 with the electronic device 101 through a wireless communication network based on a first communication connection request based on the provisioning profile from the electronic device 101, and provide the first operational profile to the electronic device 101 through the first communication connection 22. According to other embodiments, the wireless communication network may include a specific node of the wireless communication network. For example, the wireless communication network may include at least one of a base station (BS), a subscriber information management node, or a mobility management node of the wireless communication network. According to one embodiment, the wireless communication network may include a home location register (HLR) and/or an authentication center (AuC) server which the electronic device 101 accesses to perform a subscriber authentication function, and may be connected to the communication service server 240 which may provide a communication service such as voice communication or data communication after authentication.

According to another embodiment, the MNO server 230 may be a server associated with a mobile communication network operator. According to yet another embodiment, the MNO server 230 may request the SM-DP+ server 220 to prepare at least one profile (or profile package) (e.g., the first operational profile) associated with at least one piece of subscriber identification information (e.g., the first subscriber identification information), and transmit information associated with the first operational profile to the SM-DP+ server 220. According to still another embodiment, the MNO server 230 may transmit a signal for updating and managing the first operational profile to the SM-DP+ server 220. The MNO server 230 may, for example, allow a second communication connection 24 between the electronic device 101 and the communication service server 240 through the second operational profile installed in the eSIM 201 of the electronic device 101.

According to some embodiments, the communication service server 240 may be a server that provides a communication service. According to other embodiments, the communication service may be a service related to transmission or reception of data through the wireless communication network. In an embodiment, the communication service may include a service associated with transmission or reception of another profile (or data) that does not include subscriber identification information, in addition to downloading an operational profile (e.g., the first operational profile including the first subscriber identification information). The communication service server 240 may, for example, include a service server associated with various data transmissions and receptions, such as a server associated with each of various applications, a push server, a search server, or a market server, and the communication service provided by the communication service server 240 may include various services such as data transmission/reception, notification reception, push reception, link reception and access, or a service request from an application.

In another embodiment, when the electronic device 101 requests a service associated with transmission or reception of a profile (or data) that does not include subscriber identification information, the electronic device 101 may establish the second communication connection 24 with the communication service server 240 based on the second operational profile.

In still another embodiment, the SM-DS server 210, the SM-DP+ server 220, the MNO server 230, or the communication service server 240 is merely an implementation example of a server for performing each function, and may be called by another name. Each of the SM-DS server 210, the SM-DP+ server 220, the MNO server 230, and the communication service server 240 may include one or more servers. Some or all of the SM-DS server 210, the SM-DP+ server 220, the MNO server 230, and the communication service server 240 may be configured as one integrated server. In yet another embodiment, an electronic device (e.g., the electronic device 101 of FIG. 1A or 1B or the electronic device 101 of FIG. 2) may include a display (e.g., the display device 160 of FIG. 1A), a communication module (e.g., the communication module 190 of FIG. 1A), an eSIM (the SIM 196 of FIG. 1A or the eSIM 201 of FIG. 2) storing first information associated with a first communication connection for downloading data including first subscriber identification information for accessing at least one communication service providing server, memory (e.g. the memory 130 of FIG. 1A or the memory 211 of FIG. 2), a display, and a processor (e.g., the processor 120 of FIG. 1A) electrically connected to the communication module and the memory, and the processor may be configured to establish the first communication connection for downloading the data including the first subscriber identification information, end the first communication connection, when requesting transmission or reception of data that does not include the first subscriber identification information during the first communication connection, and perform the transmission or reception of the data by establishing a second communication connection based on second subscriber identification information.

Figure 3:
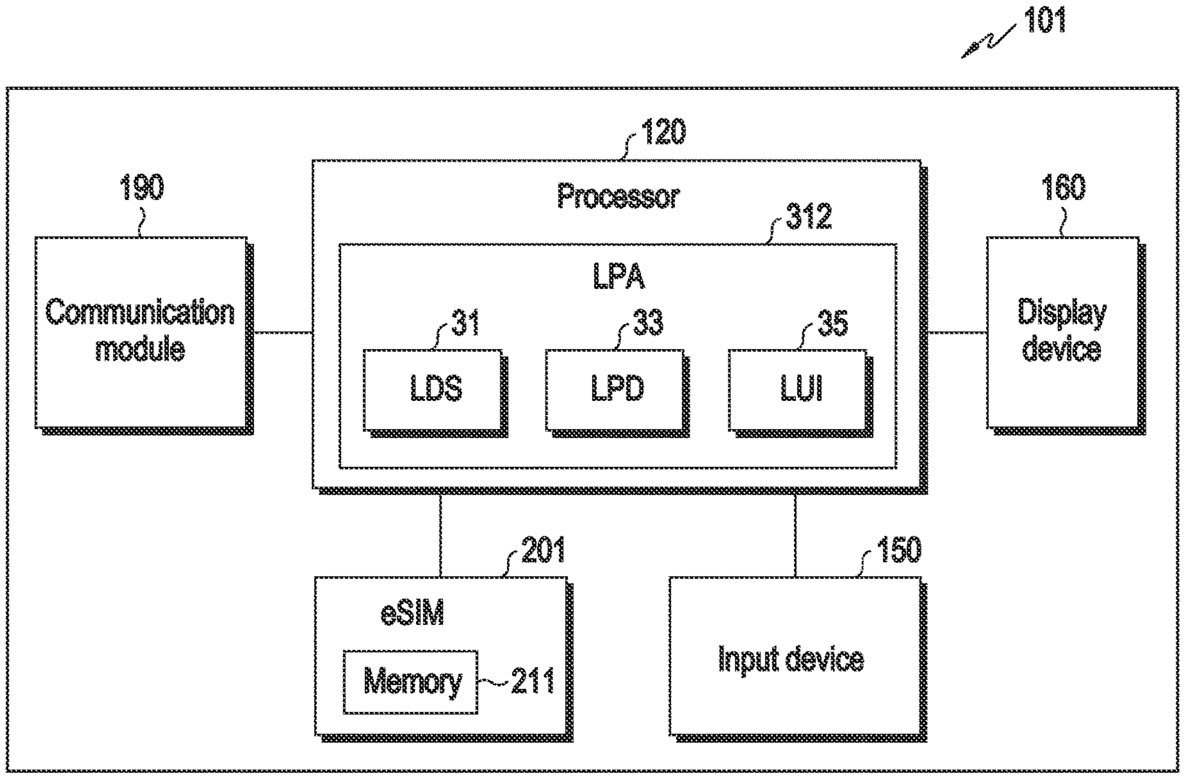
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, an electronic device 101 of FIG. 1A or 1B or an electronic device 101 of FIG. 2 according to various embodiments may include a processor 120, an eSIM 201, a communication module 190, a display device 160, and an input device 150. While not shown for convenience of description, the electronic device 101 may include two or more slots in which two or more rSIMs may be accommodated.

According to an embodiment, the processor 120 (e.g., the processor 120 of FIG. 1A) may include one or more processors (e.g., the main processor 121 and the auxiliary processor 123 of FIG. 1A, or an AP and a CP), and according to an embodiment, include a local profile assistant (LPA) 312 (e.g., LPA device (LPAd)). According to another embodiment, when the processor 120 includes a plurality of processors, a part of the LPA 312 may be included in some of the plurality of processors, and another part of the LPA 312 may be included in others of the plurality of processors. According to various embodiments, the LPA 312 may be included in the eSIM 201. The LPA 312 may be referred to as an LPAe (eUICC).

According to yet another embodiment, the LPA 312 may communicate with a server to support profile download, installation, and management operations of the eSIM 201 or provide a user interface required for the profile download, installation, and management operations. The LPA 312 may, for example, be a module that provides the operations of local discovery services (LDS) 31, local profile download (LPD) 33, and a local user interface (LUI) 35 in the electronic device 101.

According to still another embodiment, the LDS 31 may communicate with an SM-DS server (e.g., the SM-DS server 210 of FIG. 2) and receive, from the SM-DS server, an address of an SM-DP+ server (e.g., the SM-DP+ server 220 of FIG. 2) from which an operational profile may be downloaded based on a provisioning profile.

According to some embodiments, the LPD 33 may establish a first communication connection (e.g., the first communication connection 22 of FIG. 2) with the SM-DP+ server 220 through a wireless communication network based on the address of the SM-DP+ server 220, and receive a first operational profile from the SM-DP+ server 220 through the first communication connection 22. According to other embodiments, the LPD 33 may support network-initiated profile download, enabling, disabling, deletion, or profile policy rule (PPR) download, or support profile enabling, disabling, deletion, or eUICC reset of the electronic device.

The LUI 35 may, for example, perform an operation of providing various user interfaces, when the operational profile is downloaded. According to an embodiment, the LUI 35 may support data exchange between the LDS 31 & the LPD 33 and a user, and include a user interface (UI) transmitting a user input to the LDS 31 or the LPD 33.

According to another embodiment, the processor 120 may perform a communication service based on information stored in the eSIM 201 by using (or executing) the LPA 312. In an example, the processor 120 may establish the first communication connection 22 with the SM-DP+ server 220 through the communication module 190 based on the provisioning profile stored in the eSIM 201 by using the LPA 32, to download a profile (e.g., the first operational profile) including the first subscriber identification information. In another example, when requesting transmission or reception of a profile or data that does not include the subscriber identification information by using the LPA 312 during the first communication connection 22, the processor 120 may end the first communication connection and establish a second communication connection (e.g., the second communication connection 24 of FIG. 2) based on second subscriber identification information to perform the transmission or reception of the profile or data that does not include the subscriber identification information.

According to yet another embodiment, the eSIM 201 (e.g., the SIM 196 of FIG. 1A or the eSIM 201 of FIG. 2) may include one or more profiles as information for receiving a communication service. The profile may refer to a software package of at least one of an application, a file system, or an encryption key value stored in the eSIM 201. For example, the profile may include a provisioning profile and/or an operational profile. In some cases, the provisioning profile may not be used. The operational profile may, for example, include subscriber identification information, and in addition to the subscriber identification information, further include network access authentication information about a subscriber, a phone book of the subscriber, personal information (e.g., SMS) about the subscriber, the name of a subscribed communication service provider, an available service, an available data amount, a rate or service providing speed, or information that enables safe use of wireless communication by performing subscriber authentication and traffic security key generation during access to a wireless communication network such as GSM, WCDMA, LTE, NR, and so on. According to still another embodiment, the operational profile may include a SIM profile. For example, the SIM profile may include a SIM file system (a master file (MF)), a dedicated file (DF), and an elementary file (EF), and a subscriber identification information (IMSI) value may be stored in the EF.

According to some embodiments, the provisioning profile may be a profile including first information for downloading a first operational profile in the electronic device. In an example, the first information may include communication session information for a first communication connection specified for downloading the first operational profile. In another example, the communication session information may include access information about an SM-DS server (e.g., the SM-DS server 210 of FIG. 2) for downloading the first operational profile, and information about a communication service provider network available for accessing the SM-DS server.

According to other embodiments, the communication module 190 (e.g., the communication module 190 of FIG. 1A) may establish the first communication connection 22 based on the provisioning profile or establish the second communication connection 24 based on the second operational profile. At least one screen associated with first communication based on the provisioning profile or second communication based on the second operational profile may be displayed on the display device 160.

In an embodiment, while the LPA 312 has been described as a configuration included in the processor 120, at least some functions of the LPA 312 may be performed by the processor 120 or a separate LPA 312 may operate in conjunction with the processor 120. For example, the LPA 312 may be included in a program (e.g., the program 140 of FIG. 1A), and loaded and executed in the processor 120. In another embodiment, when the LPA 312 is loaded and executed in the processor 120, this may be understood as an operation of the processor 120. In yet another embodiment, the functional modules (e.g., the LDS 31, the LPD 33, or the LUI 35) included in the LPA 312 are illustratively classified and may be represented as other functional modules, not limited to the embodiment. According to various embodiments, the LPA 312 may be included in the eSIM 201.

Figure 4:
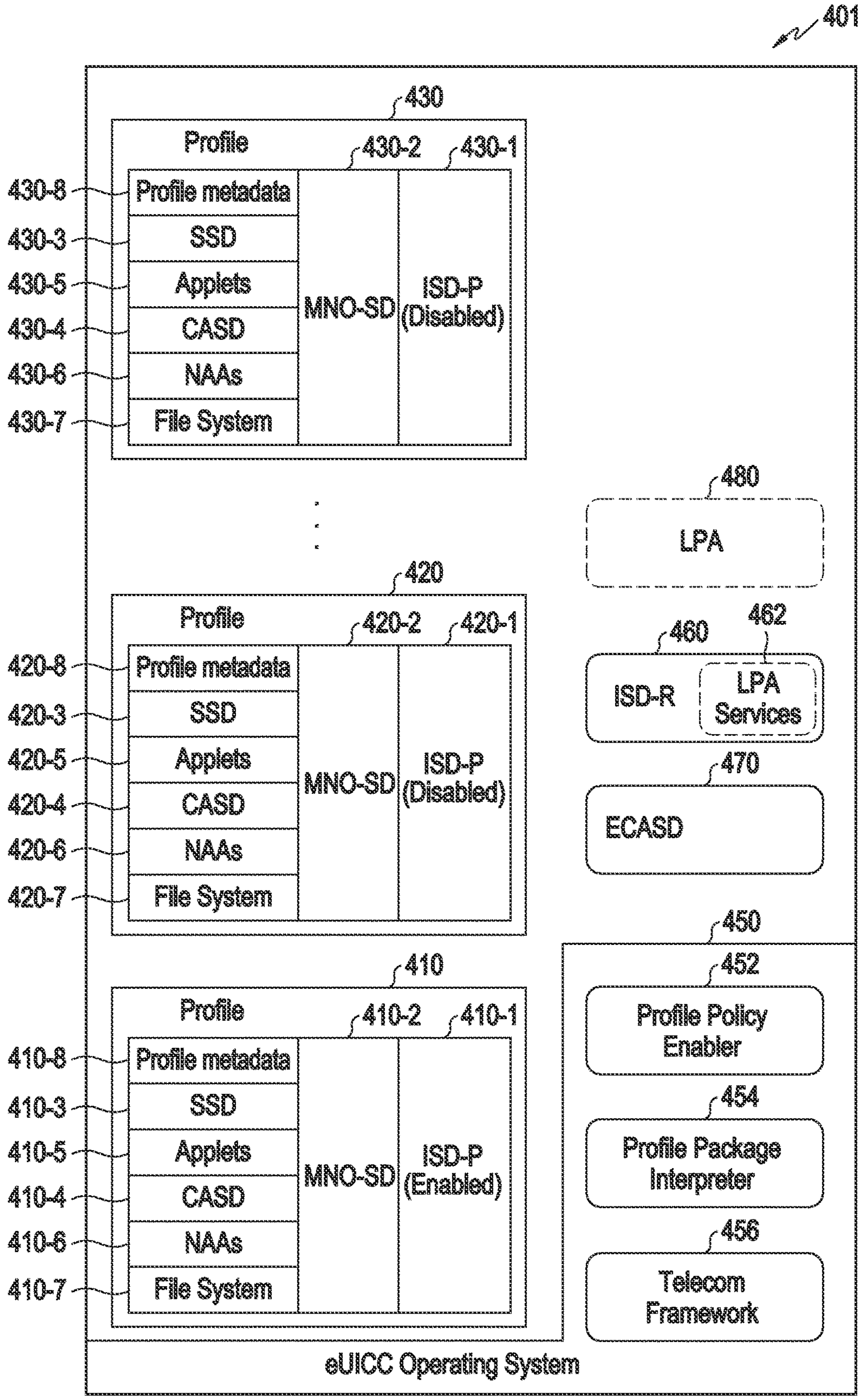
FIG. 4 is a diagram illustrating an internal structure of an eUICC according to an embodiment of the disclosure.

FIG. 4 is a diagram illustrating an internal structure of an eUICC according to an embodiment of the disclosure.

Referring to FIG. 4, an eUICC 401 (e.g., an eSIM 201 of FIG. 2 or 3) according to an embodiment may be in a form of a card or a chip, and at least one profile 410, 420 and 430 in a software format may be installed in the eUICC 401. According to some embodiments, each of the at least one profile 410, 420, and 430 may be a profile for testing, a provisioning profile, or an operational profile. The at least one profile 410, 420, and 430 may operate on an eUICC operating system (OS) 450. Each of the at least one profile 410, 420 and 430 may be enabled or disabled by a processor or an LPA (e.g., an LPA 312 of FIG. 3 or an LPA 480 of FIG. 4). In FIG. 4, one profile 410 according to an embodiment may be in an enabled state, and the other profiles 420 and 430 may be in a disabled state.

In an embodiment, the eUICC OS 450 of the eUICC 401 may include a profile policy enabler 452, a profile package interpreter 454, and a telecom framework 456. In another embodiment, the profile policy enabler 452 may manage a PPR for each of the at least one profile 410, 420 and 430. In yet another embodiment, the profile package interpreter 454 may unpackage a profile package received from an SM-DP+ (e.g., SM-DP+ 220 of FIG. 2) into a form installable in the eUICC 401. In still another embodiment, the telecom framework 456 may perform a function related to communication of applications within the eUICC 401. According to various embodiments, the eUICC 401 may include an issuer security domain root (ISD-R) 460 and an eUICC controlling authority security domain (ECASD) 470. According to one embodiment, the ISD-R 460 may manage the at least one profile 410, 420 and 430 installed in the eUICC 401. For example, the ISD-R 460 may include LPA services 462, and the LPA services 462 may manage the at least one profile 410, 420 and 430 installed in the eUICC 401 with the processor or the LPA (e.g., the PA 312 of FIG. 3 or the LPA 480 of FIG. 4) through an interface. According to another embodiment, the ECASD 470 may perform security processing of the at least one profile 410, 420 and 430 installed in the eUICC 401.

According to some embodiments, each of the at least one profile 410, 420 and 430 may include an ISD-P 410-1, 420-1, or 430-1, an MNO-SD 410-2, 420-2, or 430-1, a supplementary security domain (SSD) 410-3, 420-3, or 430-3, a controlling authority security domain (CASD) 410-4, 420-4, or 430-4, applets 410-5, 420-5, or 430-5, network access applications (NAAs) 410-6, 420-6, or 430-6, a file system 410-7, 420-7, or 430-7, or profile metadata 410-8, 420-8, or 430-8.

In an embodiment, the ISD-P 410-1, 420-1, or 430-1 may include information for decoding and interpreting a profile package and be used to unpackage and install a profile package received from the SM-DP+ 220 in cooperation with the profile package interpreter 454.

In another embodiment, the MNO-SD 410-2, 420-2, or 430-2 may include an OTA key of MNO and include information for providing a secure OTA channel for communication with MNO.

In yet another embodiment, the SSD 410-3, 420-3, or 430-3 and the CASD 410-4, 420-4, or 430-4 may include information for performing security processing of a profile.

In still another embodiment, the applets 410-5, 420-5, or 430-5 may include various application information associated with a profile user.

The NAAs 410-6, 420-6, or 430-6 may include application information enabling a profile to access a network.

According to one embodiment, the file system 410-7, 420-7, or 430-7 may include a file system associated with each piece of information of the profile.

According to another embodiment, the profile metadata 410-8, 420-8, or 430-8 may also be referred to as a profile record and include metadata information about the profile in the form of text. The metadata information may, for example, include at least one of an integrated circuit card ID (ICCID) of a profile, a profile name, the name of an MNO providing the profile, a user's profile nickname, an icon, a profile class, notification configuration information, profile owner information, or a PPR.

The ICCID of the profile is a profile ID and may represent a unique ID of each profile. The profile name may include the name of each profile. The name of the MNO providing the profile may include the name of a communication operator that provides the profile. The user's profile nickname may include a profile nickname designated by the user. The icon may include an icon corresponding to the profile. In an embodiment, the profile class may include information indicating whether the type of the profile is a provisioning profile or an operational profile. The notification configuration information may include the address of a server (e.g., the SM-DP+ server 220) to receive a notification. In another embodiment, the profile owner information may include a mobile country code (MCC), a mobile network code (MNC), and group identifier (GID) 1 or 2 information, which are associated with a profile owner. For example, the MCC may be a code identifying a country, and the MNC may be a code identifying a mobile communication operator. GID 1 or 2 may be code area information identifying a group or area to which the profile belongs. Region information may include a group including a plurality of countries. The PPR may include policy rule information for managing the profile.

According to some embodiments, the electronic device 101 may identify whether the profile is a provisioning profile or an operational profile by using the profile class information of the profile metadata 410-8, 420-8, or 430-8 included in each of the at least one profile 410, 420, and 430 included in the eUICC 401, and enable or disable the provisioning profile or the operational profile through the LPA (the LPA 312 of FIG. 3 or the LPA 480 of FIG. 4).

Figure 5A:
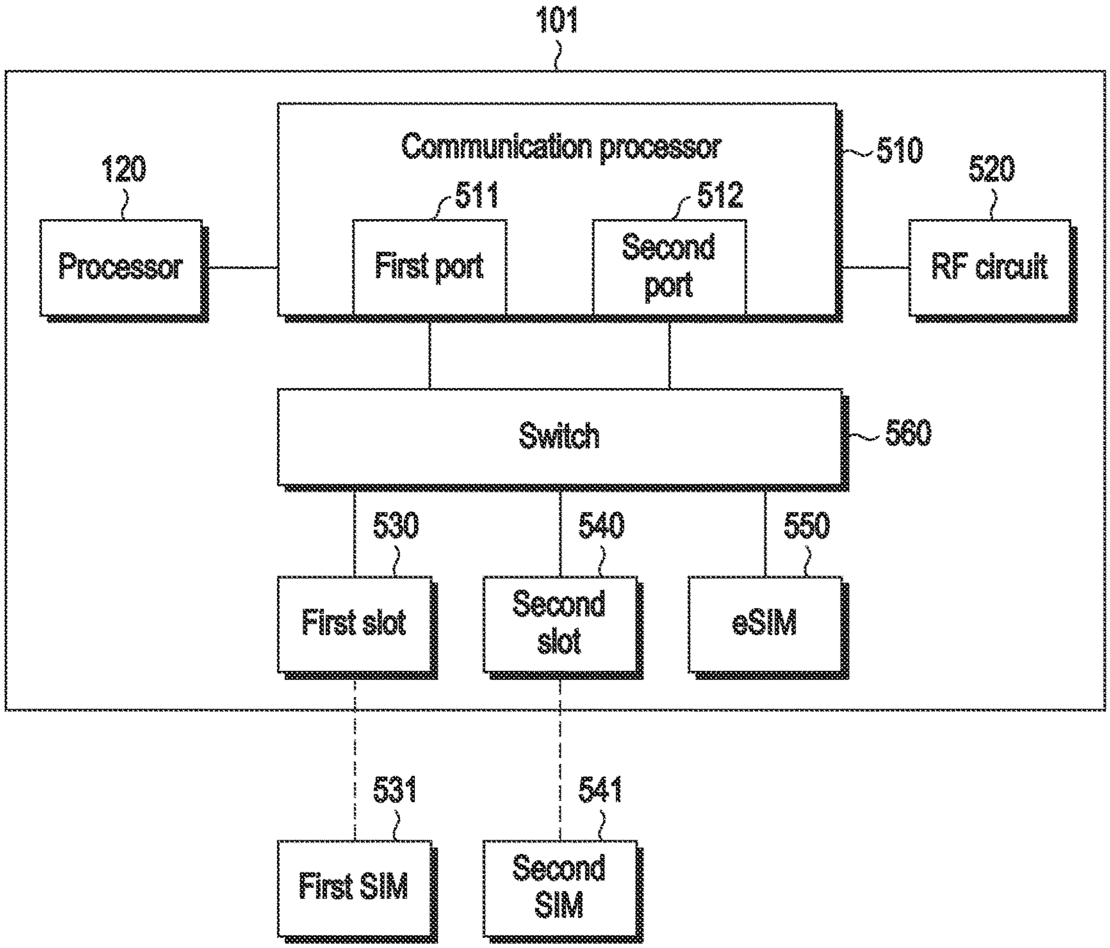
FIG. 5A is a block diagram illustrating an electronic device according to an embodiment of the disclosure.

FIG. 5A is a block diagram illustrating an electronic device according to an embodiment of the disclosure.

According to various embodiments, an electronic device 101 may include at least one of a processor 120, a CP 510, an RF circuit 520, a first slot 530, a second slot 540, an eSIM 550, or a switch 560. The CP 510 may, for example, support establishment of a communication channel in a band to be used for wireless communication and network communication through the established communication channel. For example, the communication processor 510 may support at least one of $2^{nd}$ generation (2G), $3^{rd}$ (3G), $4^{th}$ generation (4G), or $5^{th}$ generation) 5G) network communication. The RF circuit 520 may include at least one of, for example, a radio frequency integrated circuit (RFIC), a radio frequency front end (RFFE), or an antenna module. The RF circuit 520 may process data (e.g., a baseband signal) output from the CP 510 into an RF signal, and transmit the RF signal through the antenna module. In an embodiment, the RF circuit 520 may convert an RF signal received through the antenna module into a baseband signal and transmit the converted baseband signal to the CP 510. In another embodiment, the RF circuit 520 may process an RF signal or a baseband signal according to a communication scheme supported by the CP 510, and the type of the RF circuit 520 is not limited.

An interface between components may be implemented as, for example, a general purpose input/output (GPIO) interface, a universal asynchronous receiver/transmitter (UART) (e.g., high speed-UART (HS-UART)) interface, or a peripheral component interconnect bus express PCIe) interface, and the type of the interface is not limited. At least some of the components may, for example, exchange control information or packet data information by using, for example, a shared memory. In the embodiment of FIG. 5A, the processor 120 and the CP 510 are shown as different hardware. However, this is merely illustrative, and although the processor 120 and the CP 510 may be implemented as different hardware, they may be implemented on a single chip according to another implementation.

The CP 510 according to some embodiments may perform an authentication procedure based on information stored in the afore-mentioned SIM. The CP 510 may be connected to a first SIM 531 through the first slot 530 corresponding to a first port 511. In an embodiment, the CP 510 may be connected to a second SIM 541 through the second slot 540 corresponding to a second port 512. In another embodiment, the first SIM 531 and the second SIM 541, which are rSIMs, may not be connected at a time of testing the electronic device 101. Later, as the user inserts an rSIM into a slot, the electronic device 101 may use information stored in the rSIM. For example, the first slot 530 may be a structure that may accommodate the first SIM 531 that is an rSIM, and include at least one terminal which when the first SIM 531 is accommodated, may transmit information from the first SIM 531 to the CP 510. In yet another embodiment, the second slot 540 may be a structure that may accommodate the second SIM 541, which is an rSIM, and include at least one terminal which when the second SIM 541 is accommodated, may transmit information from the second SIM 541 to the CP 510. The first slot 530 and the second slot 540 may be of the same type or different types depending on implementation. The CP 510 may, for example, obtain information stored in the first SIM 531 from the first SIM 531 accommodated in the first slot 530 through, for example, the first port 511. For example, at least one of the first SIM 531, the second SIM 541, or the eSIM 550 (e.g., the eSIM 201 of FIG. 3) may store at least one of an ICCID, an IMSI, home public land mobile network (HPLMN)-related information, or a mobile subscriber international ISDN number (MSISIDN). This may be referred to as an EF. In an embodiment, the CP 510 may perform an authentication procedure for network communication corresponding to the first SIM 531 through the RF circuit 520 based on the obtained information stored in the first SIM 531. When the authentication is successful, the CP 510 may perform network communication corresponding to the first SIM 531 through the RF circuit 520. In an example, the CP 510 may obtain information of the second SIM 541 or information stored in the eSIM 550 through the second port 512. To perform a first test associated with a first protocol stack corresponding to the first port 511 (or the first slot 530), an rSIM should be inserted into the first slot 530 before the first test is performed, in a conventional method. However, the electronic device 101 according to various embodiments may perform a test associated with the first protocol stack corresponding to the first slot 530, even though the rSIM is not inserted into the first slot 530.

At least one of the processor 120 or the CP 510 according to some embodiments may control a state of the switch 560. Depending on the state of the switch 560, the eSIM 550 may be connected to either the first port 511 or the second port 512. In an example, the electronic device 101 may determine to perform the first test on the first protocol stack associated with the first port 511 or the first slot 530. As will be described in more detail later, a profile for the first test enabled in the eSIM 550 may be used in the first test. As the eSIM 550 is connected to the first port 511 in the first test, the switch 560 may be controlled such that the profile enabled in the eSIM 550 is used in the first test of the first protocol stack corresponding to the first port 511. Connection between the first port 511 corresponding to the first slot 530 and the eSIM 550 may be referred to as binding the first slot 530 to the eSIM 550. Even when the first SIM 531 is not inserted into the first slot 530, the electronic device 101 may perform the test associated with the protocol stack corresponding to the first port 511 by using the profile enabled in the eSIM 550. In an embodiment, the electronic device 101 may determine to perform a second test on the second protocol stack associated with the second slot 540. A profile for the second test enabled in the eSIM 550 may be used in the second test. As the eSIM 550 is connected to the second port 512 in the second test, the switch 560 may be controlled such that the profile enabled in the eSIM 550 is used in the second test of the second protocol stack corresponding to the second port 512. In another embodiment, connection between the second port 512 corresponding to the second slot 540 and the eSIM 550 may be referred to as binding the second slot 540 to the eSIM 550. Accordingly, even when the second SIM 541 is not inserted into the second slot 540, the electronic device 101 may perform the test associated with the protocol stack corresponding to the second port 512 by using the profile enabled in the eSIM 550. The electronic device 101 may control the switch 560 in terms of hardware to connect the eSIM 550 to a specific port in order to perform a test related to a protocol stack corresponding to a specific slot. As the eSIM 550 is connected to the specific port (or the eSIM 550 is bound to the specific slot), the eSIM 550 may be used in the process of testing the specific protocol stack corresponding to the specific port.

Figure 5B:
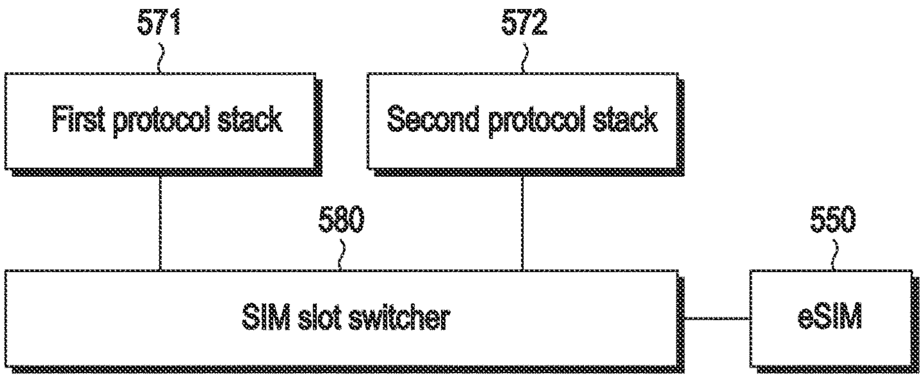
FIG. 5B is a block diagram illustrating software-based switching in an electronic device according to an embodiment of the disclosure.

FIG. 5B is a block diagram illustrating software-based switching in an electronic device according to an embodiment of the disclosure.

According to various embodiments, a SIM slot switcher 580 may be executed by a processor 120 and/or a CP 510 in an electronic device 101. The SIM slot switcher 580 may support a function of associating an eSIM 550 with any one of protocol stacks 571 and 572 of the electronic device 101. The SIM slot switcher 580 may associate the eSIM 550 with one of the protocol stacks 571 and 572 of the electronic device 101, for example, by mapping a specific port number (or a specific slot number) to the eSIM 550. In an example, the SIM slot switcher 580 may control to use a profile enabled in the eSIM 550 in a test process of the first protocol stack 571 or a test process of the second protocol stack 572. In the embodiment of FIG. 5B, the eSIM 550 is shown as directly connected to the first protocol stack 571 or the second protocol stack 572 through the SIM slot switcher 580, for convenience of description. As described above, the SIM slot switcher 580 may bind the eSIM 550 to a specific slot by mapping a port number (or slot number) to the eSIM 550.

With reference to FIGS. 5A and 5B, when the electronic device 101 determines to perform a test associated with a specific protocol stack, the electronic device 101 may control the switch 550 in terms of hardware to associate the specific protocol stack with the SIM 550 and/or use data of the eSIM 550 in terms of software in a test of the specific protocol stack.

Figure 6:
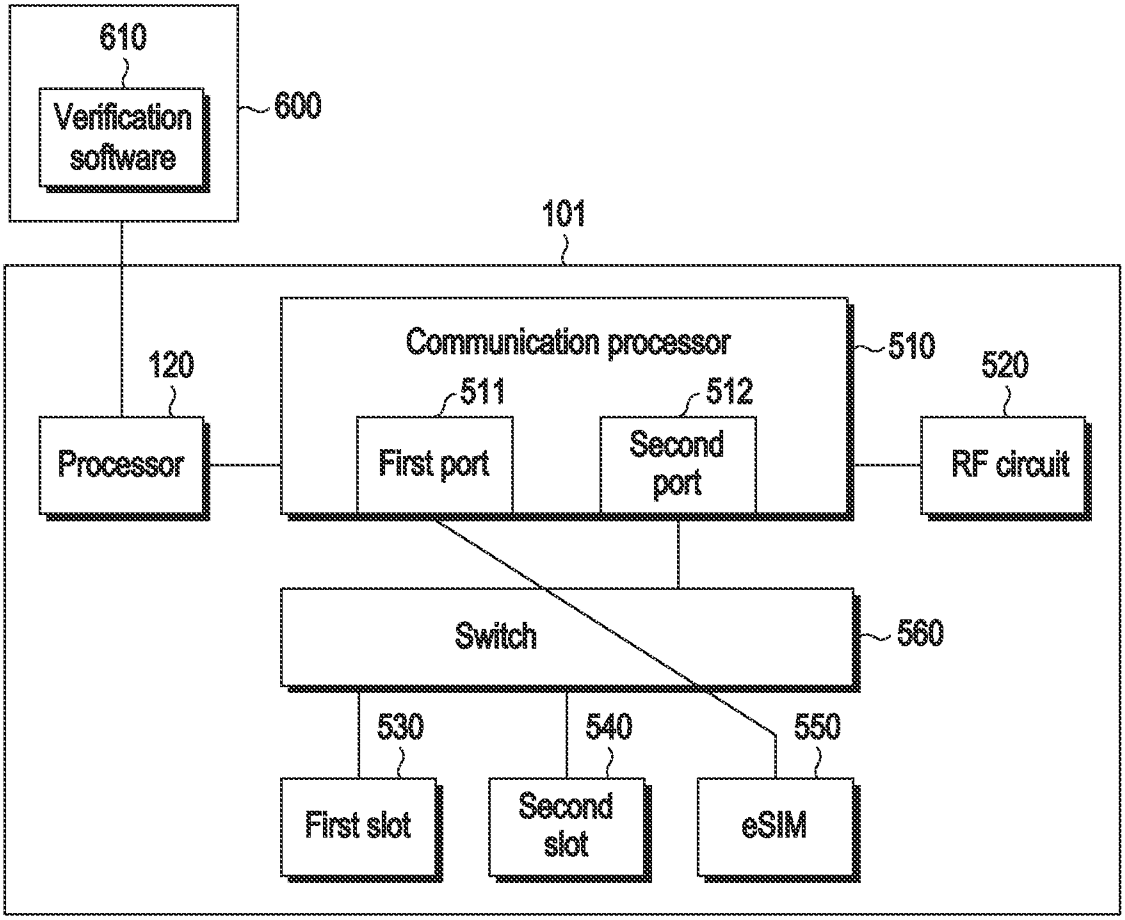
FIG. 6 is a block diagram illustrating an electronic device according to an embodiment of the disclosure.

FIG. 6 is a block diagram illustrating an electronic device according to an embodiment of the disclosure.

According to various embodiments, an electronic device 101 may be wiredly or wirelessly connected to an external device 600. The external device 600 is an electronic device other than an SM-DP+ server 220, and may store and execute verification software 610. The verification software 610 may store instructions for performing a test operation associated with a specific protocol stack of the electronic device 101. For example, the verification software 610 may determine to perform a test associated with the first protocol stack corresponding to a first slot 530 (or a first port 511) of the electronic device 101. The verification software 610 may provide a request for binding an eSIM 550 to the first slot 530 to the electronic device 101. In an embodiment, the electronic device 101 may control the switch 560 based on the received request and bind the eSIM 550 to the first port 511 by connecting the eSIM 550 to the first slot 530. Meanwhile, the connection of the eSIM 550 to the first port 511 in terms of hardware is described in connection with FIG. 5B, the electronic device 101 may bind the first slot 530 to the eSIM 550 by associating the eSIM 550 with the first protocol stack corresponding to the first port 511. In another embodiment, when the eSIM 550 is already bound to the first slot 530, the verification software 610 may not request binding control (or change). The verification software 610 may identify the state of each port (or each slot) and determine whether to request binding control (or change) according to the state of the port (or the slot).

For the first test of the first protocol stack, the verification software 610 according to various embodiments may provide data for writing a profile for testing to the eSIM 550 and enabling the profile for testing to the electronic device 101. In an embodiment, an operation of writing a profile may mean, for example, installation of the profile in the eSIM 550, and "write" in the disclosure may be replaced with an expression "install". When the verification software 610 includes the profile for testing, it may provide the profile and a command to write the profile to the electronic device 101. In another embodiment when the verification software 610 does not include the profile for testing, it may obtain information about the profile for testing stored in the electronic device 101, and provide a command for writing the specific profile to the electronic device 101. As described above, the profile for testing may be written and enabled in the eSIM 550 of the electronic device 101. In yet another embodiment, the verification software 610 may use the enabled profile to perform the first test associated with the first protocol stack, for example, various operations such as an operation associated with a call and an operation for data communication. The test operation is not limited, as long as it is an operation related to communication performed by the electronic device 101. The verification software 610 may be stored in the electronic device 101. Even when the electronic device 101 is not connected to the external device 600, the electronic device 101 may perform the test operation.

According to an embodiment, when the electronic device 101 completes the first test associated with the first protocol stack corresponding to the first slot 530 (or the first port 511), the verification software 610 may determine to perform the second test associated with the second protocol stack corresponding to the second slot 540 (or the second port 512). According to another embodiment, the verification software 610 may request the electronic device 101 to bind the eSIM 550 to the second slot 540. The electronic device 101 may bind the eSIM 550 to the second slot 540 based on the request. A profile for testing for the second protocol stack may be written and enabled in the eSIM 550 of the electronic device 101. According to still another embodiment, the verification software 610 may use the enabled profile to perform the second test associated with the second protocol stack, for example, various operations such as an operation associated with a call and an operation for data communication.

As described above, even though rSIMs are not inserted into the slots 530 and 540 of the electronic device 101, a test may, for example, be performed by connecting the eSIM 550 to a test port and/or associating the eSIM 550 with a protocol stack.

Figure 7A:
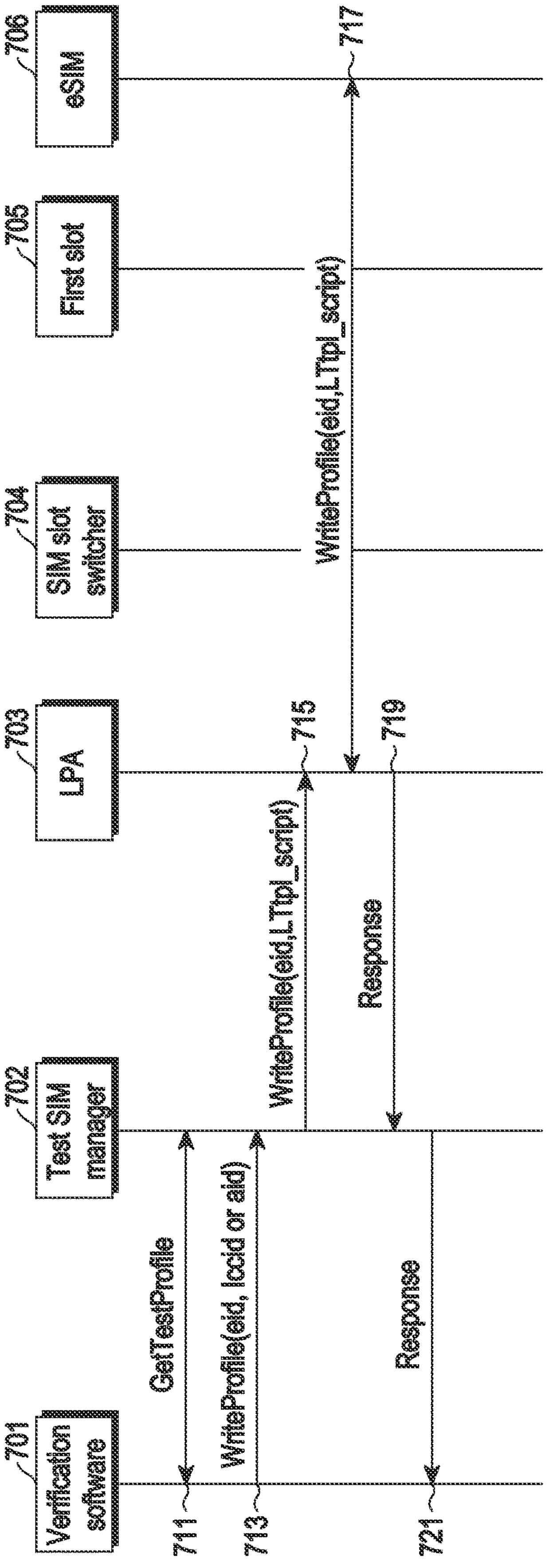
FIG. 7A is a flowchart illustrating a method of operating an electronic device according to an embodiment of the disclosure.

FIG. 7A is a flowchart illustrating a method of operating an electronic device according to an embodiment of the disclosure.

According to various embodiments, verification software 701 may request association between a specific protocol stack and an eSIM. In an example, the verification software 701 may request binding between a specific slot (or a specific port) and the eSIM. The verification software 701 may be executed, for example, by at least one processor (e.g., a processor 120 and/or a CP 510) of an electronic device 101. Alternatively, the verification software 701 may be executed by an external device 600 wiredly or wirelessly connected to the electronic device 101. The verification software 701 may transmit and receive data to and from a test SIM manager 702. For example, the verification software 701 may request removal of a SIM from the specific slot (or port), for example, unbinding of the eSIM. In another example, the verification software 701 may include instructions for a verification operation associated with a communication function or a function affected by the communication function. The verification software 701 may include and/or generate a profile for testing (e.g., a local profile for testing loading (LTPL) script).

In an embodiment, the operation of the verification software 701 and/or the test SIM manager 702 may be understood as an operation performed by, for example, the electronic device 101 and/or the external device 600. In another embodiment, the test SIM manager 702 may transmit and receive data to and from the verification software 701. In still another embodiment, the test SIM manager 702 may be executed by the at least one processor (e.g., the processor 120 and/or the CP 510) of the electronic device 101. Alternatively, the verification software 701 may be executed by the test SIM manager 702 wiredly or wirelessly connected to the electronic device 101. The test SIM manager 702 is described as an entity independent of the verification software 701 in the embodiment of 7A, and the verification software 701 and the test SIM manager 702 may be implemented as one software package. In yet another embodiment, the test SIM manager 702 may include and/or generate the profile for testing (e.g., the LTPL script). The test SIM manager 702 may transmit and receive data to and from an LPA 703, a SIM slot switcher 704, a first slot 705, and/or an eSIM 706.

According to some embodiments, the verification software 701 may perform a GetTestProfile procedure with the test SIM manager 702 in operation 711. Referring to FIG. 7A, it is assumed that a profile for testing is stored in the test SIM manager 702, not in the verification software 701. The GetTestProfile procedure of operation 711 may include an operation of providing a request to the test SIM manager 702 by the verification software 701 and an operation of providing a response to the verification software 701 by the test SIM manager 702. Table 1 is an example of the GetTestProfile procedure according to various embodiments.

TABLE 1

| Operation | Parameter name | Description | Type | MOC |
|---|---|---|---|---|
| Request | iccid | iccid of profile from which information is to be identified | String | O |
| | aid | aid of profile from which information is to be identified | String | O |
| Response | OperationResult | Operation result | Integer | M |
| | ProfileInfo | Test profile information list | Array of Profile Info | M |

In an example, the verification software 701 may provide a request including a parameter (e.g., iccid) indicating the iccid of a profile from which information is to be identified and/or a parameter (e.g., aid) indicating the aid of a profile from which information is to be identified. In Table 1, Type may be classified as an integer, a string, or an array of profile info, and MOC may indicate whether a corresponding parameter is mandatory, optional, or conditional. The formats or values of Type and MOC are simply illustrative. The test SIM manager 702 may provide a response to the verification software 701, and the response may include a parameter indicating an operation result (e.g., operationResult) and/or a parameter indicating a profile for testing information list (ProfileInfo). In an embodiment, the parameter indicating an operation result may indicate, but not limited, success or failure of an operation. In another embodiment, the verification software 701 may identify information of the profile for testing based on the received response. Although the profile for testing may include a test profile, an operational profile may also be used as the profile for testing. When no information is included in the request, the test SIM manager 702 may return a full list of profiles.

According to other embodiments, the verification software 701 may provide a WriteProfile request, which is a command for writing the profile for testing, to the test SIM manager 702 in operation 713. Table 2 is an example of WriteProfile according to various embodiments.

TABLE 2

| Operation | Parameter name | Description | Type | MOC |
|---|---|---|---|---|
| Request | Eid | eSIM ID for writing profile | String | M |
| | Iccid | iccid of profile | String | O |
| | aid | aid of profile | String | O |
| | Ltpl_script | Profile for encrypted LTPL | Binary | O |
| Response | OperationResult | Operation result | Integer | M |

Referring to FIG. 7A, the eid parameter may be included in the WriteProfile request, and the Iccid parameter or aid parameter may be included in the WriteProfile request. As described above, since the profile is stored in the test SIM manager 702 in the embodiment of FIG. 7A, the WriteProfile request provided from the verification software 701 to the test SIM manager 702 may not include a profile for encrypted LTPL, for example, binary information. In an embodiment, the request may include a parameter (e.g., Eid) indicating the ID of an eSIM ID to which the profile is to be written, a parameter (e.g., Iccid) indicating the iccid of the profile, a parameter (e.g., aid) indicating the aid of the profile, and/or a profile (e.g. Ltpl_Script) for encrypted LTPL. When a WriteProfile request with "Eid=89" and "iccid=89123" is provided, this may mean a command to write a profile "89123" to an eSIM with an Eid of "89". For example, the verification software 701 may request the test SIM manager 702 to write a specific profile to a specific eSIM. A response to WriteProfile may include an operation result. In another example, when "OperationResult=1", this may mean that the request is successful.

According to some embodiments, the profile (e.g., Ltpl_Script) for LTPL may be encrypted and/or decrypted, for example, with a certificate conforming to the SGP.22 standard and an additional separate certificate. Accordingly, it is possible to perform encryption and/or decryption independent of the operation of the eSIM 706 according to the standard, so that the electronic device 101 may write the profile for testing to the eSIM 706 without obtaining the profile from the SM-DP+ server 220.

According to other embodiments, the test SIM manager 702 may provide a WriteProfile request to the LPA 703 in operation 715. The WriteProfile request may follow, for example, the format shown in Table 2 in operation 715. The test SIM manager 702 may, for example, identify the eSIM and profile indicated by the WriteProfile request received from the verification software 701 in operation 713. The test SIM manager 702 may control the LPA 703 to write the identified profile to the identified eSIM (e.g., the eSIM 706). The WriteProfile request of operation 715 may include, for example, an eid parameter for specifying an eSIM and LTtpl_script indicating binary information of the profile. In operation 717, the LPA 703 may provide a WriteProfile request to write the specified profile to the eSIM (e.g., the eSIM 706) indicated by the WriteProfile request. The LPA 703 according to various embodiments may support a standard-based function and an LTPL function. The LTPL function may be a function of writing the profile to the eSIM 706 without intervention of the SM-DP+ server 220 by the LPA 703. In an example, although the LTPL function may be applied to a profile for testing, the type of a profile to which the LTPL function is applied is not limited.

In an embodiment, the WriteProfile request of operation 717 may follow the format of Table 2, for example, and include eid and LTPL_script, for example. The eSIM 706 may install the profile for testing based on the received information. The eSIM 706 may provide a response to WriteProfile to the LPA 703, and the response may include an operation result. Based on the received response, the LPA 703 may identify whether the profile has been installed successfully in the eSIM 06. In another embodiment, the LPA 703 may provide a response to WriteProfile to the test SIM manager 702 in operation 719. The response to WriteProfile may include an operation result. Based on the received response, the test SIM manager 702 may identify whether the profile has been successfully written. In yet another embodiment, the test SIM manager 702 may provide a response to WriteProfile to the verification software 701 in operation 721. The response to WriteProfile may include an operation result. Based on the received response, the verification software 701 may identify whether the profile has been successfully written.

Figure 7B:
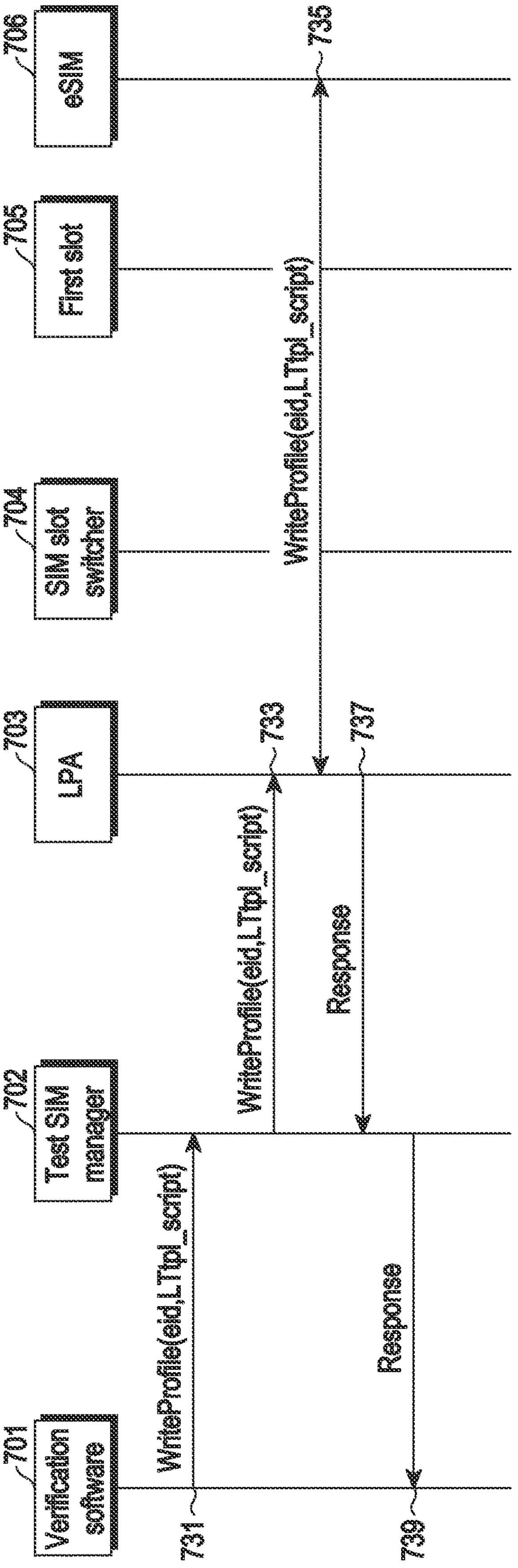
FIG. 7B is a flowchart illustrating a method of operating an electronic device according to an embodiment of the disclosure.

FIG. 7B is a flowchart illustrating a method of operating an electronic device according to an embodiment of the disclosure.

Referring to FIG. 7B, it is assumed that a profile for testing is stored in a verification software 701, not in a test SIM manager 702. According to various embodiments, the verification software 701 may provide a WriteProfile request to the test SIM manager 702 in operation 731. The WriteProfile request of operation 731 may follow the format shown in Table 2, for example. The WriteProfile request may, for example, include an eid parameter specifying an eSIM and LTtpl_script indicating binary information of the profile. As described above, since the verification software 701 stores the profile for testing, the verification software 701 may transmit a WriteProfile request including the profile to the test SIM manager 702. In operation 733, the test SIM manager 702 may provide a WriteProfile request to the LPA 703. The WriteProfile request of operation 733 may follow the format shown in Table 2, for example. The WriteProfile request may, for example, include the eid parameter specifying the eSIM and LTtpl_script indicating the binary information of the profile. The LPA 703 may provide a WriteProfile request to write the specified profile to the eSIM (e.g., the eSIM 706) indicated by the WriteProfile request in operation 735. The WriteProfile request of operation 717 may follow the format of Table 2, for example, and may include, for example, the eid and LTPL_script. In an embodiment, the eSIM 706 may install the profile for testing based on the received information. In another embodiment, the eSIM 706 may provide a response to WriteProfile to the LPA 703, and the response may include an operation result. Based on the received response, the LPA 703 may identify whether the profile has been successfully installed in the eSIM 06. In still another embodiment, the LPA 703 may provide a response to WriteProfile to the test SIM manager 702 in operation 737. The response to WriteProfile may include an operation result. Based on the received response, the test SIM manager 702 may identify whether the profile has been successfully written. The test SIM manager 702 may provide a response to WriteProfile to the verification software 701 in operation 739. The response to WriteProfile may include an operation result. Based on the received response, the verification software 701 may identify whether the profile has been successfully written.

Control between the afore-mentioned entities may, for example, be performed by communication, and a communication scheme may be determined according to the type of the electronic device 101, the type of an OS, or the type of a platform. The communication may be protected by a secure channel or encryption. Access to an internal entity of the electronic device 101 from the outside of the electronic device 101 may be allowed, when authorization is granted.

Figure 8:
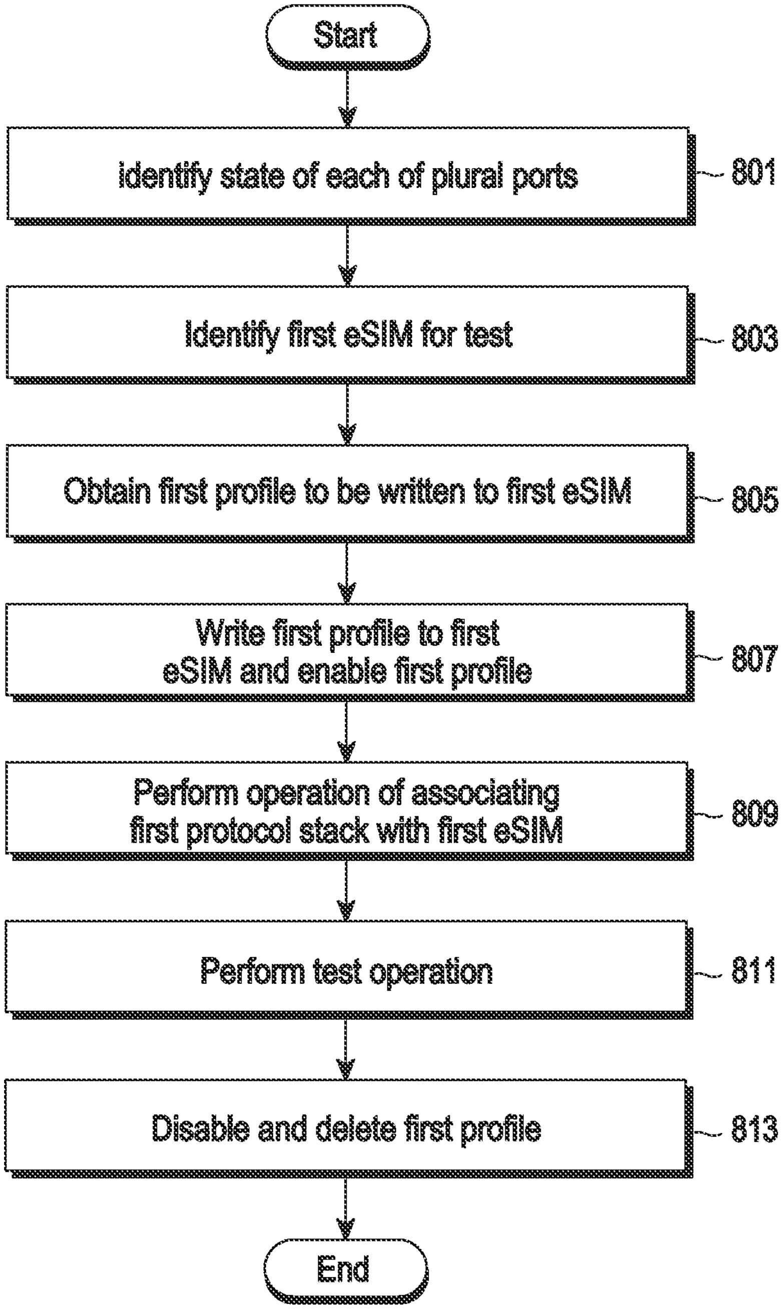
FIG. 8 is a flowchart illustrating a method of operating an electronic device according to an embodiment of the disclosure.

FIG. 8 is a flowchart illustrating a method of operating an electronic device according to an embodiment of the disclosure.

According to various embodiments, an electronic device 101 (e.g., a processor 120 and/or a CP 510) may identify the state of each of a plurality of ports (or slots) in operation 801. For example, the electronic device 101 may include the plurality of ports (e.g., ports 511 and 512 of FIG. 5A) (or the plurality of slots 530 and 540). The electronic device 101 may identify at least a part of identification information about a linked eSIM, a current state of a SIM card, or identification information about a current enabled SIM card/profile, for at least some of the plurality of ports (or slots). In an example, the electronic device 101 may identify information associated with a bound SIM for each slot. A specific operation of identifying the state of each of a plurality of ports (or slots) will be described with reference to FIG. 9. The electronic device 101 may, in another example, identify a protocol stack associated with an eSIM and use a slot and/or port as information for specifying the protocol stack, which should not be construed as limiting.

According to an embodiment, the electronic device 101 may identify a first eSIM for testing in operation 803. For example, the electronic device 101 may obtain eSIM information and identify the first eSIM for testing based on the obtained information. In another example, when the electronic device 101 identifies that the eSIM 550 is bound to the second slot 540 based on information about SIMs bound to slots, identified in operation 801, the electronic device 101 may request and obtain information about the eSIM 550 bound to the second slot 540. A detailed procedure for obtaining eSIM information will be described with reference to FIG. 9.

According to another embodiment, in operation 805, the electronic device 101 may obtain a first profile to be written to the first eSIM. When the first profile for testing is stored in the external device 600 connected to the electronic device 101 wiredly or wirelessly, the electronic device 101 may receive the first profile from the external device 600. Alternatively, the electronic device 101 may load the first profile stored in the electronic device 101. Additionally, the electronic device 101 may store an algorithm for generating a profile for testing and generate the first profile based on the stored algorithm. The first profile may be, for example, a profile for testing proposed in the GSM Association Non-confidential Official Document SGP.22. However, the type of the first profile is not limited. The electronic device 101 may obtain the first profile without using the SM-DP+ server 220.

According to yet another embodiment, the electronic device 101 may write the first profile to the first eSIM and enable the first profile in operation 807. In an example, the electronic device 101 may write the first profile to the first eSIM based on the procedure of FIG. 7A or the procedure of FIG. 7B. In another example, the electronic device 101 may write the first profile to the first eSIM, using the eid of the first eSIM, an iccid or aid identifying the first profile, and/or WriteProfile including binary information of the first profile. The electronic device 101 may enable the first profile after writing the first profile to the first eSIM, and a detailed enable procedure will be described with reference to FIG. 10.

In an embodiment, in operation 809, the electronic device 101 may perform an operation of associating the first eSIM with a first protocol stack. For example, the electronic device 101 may determine or receive a request to perform a verification operation associated with the first protocol stack corresponding to the first slot (or port). In another example, the first slot may be configured to allow the first SIM to be inserted therein, and the first protocol stack for the first SIM may be configured in the electronic device 101. In another embodiment, the electronic device 101 may determine to perform at least one verification operation associated with the first protocol stack. To perform the verification operation, it is necessary to associate the eSIM with the first profile enabled therein with the first protocol stack, for example, to bind the eSIM to the first slot. The electronic device 101 may perform an operation of associating the first eSIM with the first protocol stack, for example, an operation of binding the eSIM to the first slot. In yet another embodiment, the electronic device 101 may control to associate the first protocol stack with the first eSIM by performing the switching operation in terms of hardware and/or software, as described with reference to FIGS. 5A and 5B. For example, the switch may be controlled to connect the first port (or first slot) to the first eSIM. Alternatively, the electronic device 101 may control to use the first profile of the first eSIM in an operation based on the protocol stack associated with the first port. A detailed procedure of connecting an eSIM to a specific slot will be described with reference to FIG. 11. Depending on implementation, the electronic device 101 may be configured to be rebooted after the switching operation.

According to some embodiments, the electronic device 101 may perform a test operation in operation 811. For example, the electronic device 101 may perform a call operation and/or a data transmission/reception operation for the first protocol stack, and the test operation is not limited.

According to other embodiments, the electronic device 101 may disable and delete the first profile based on completion of the test operation in operation 813. A detailed procedure of disabling and deleting a profile will be described with reference to FIG. 12.

Figure 9:
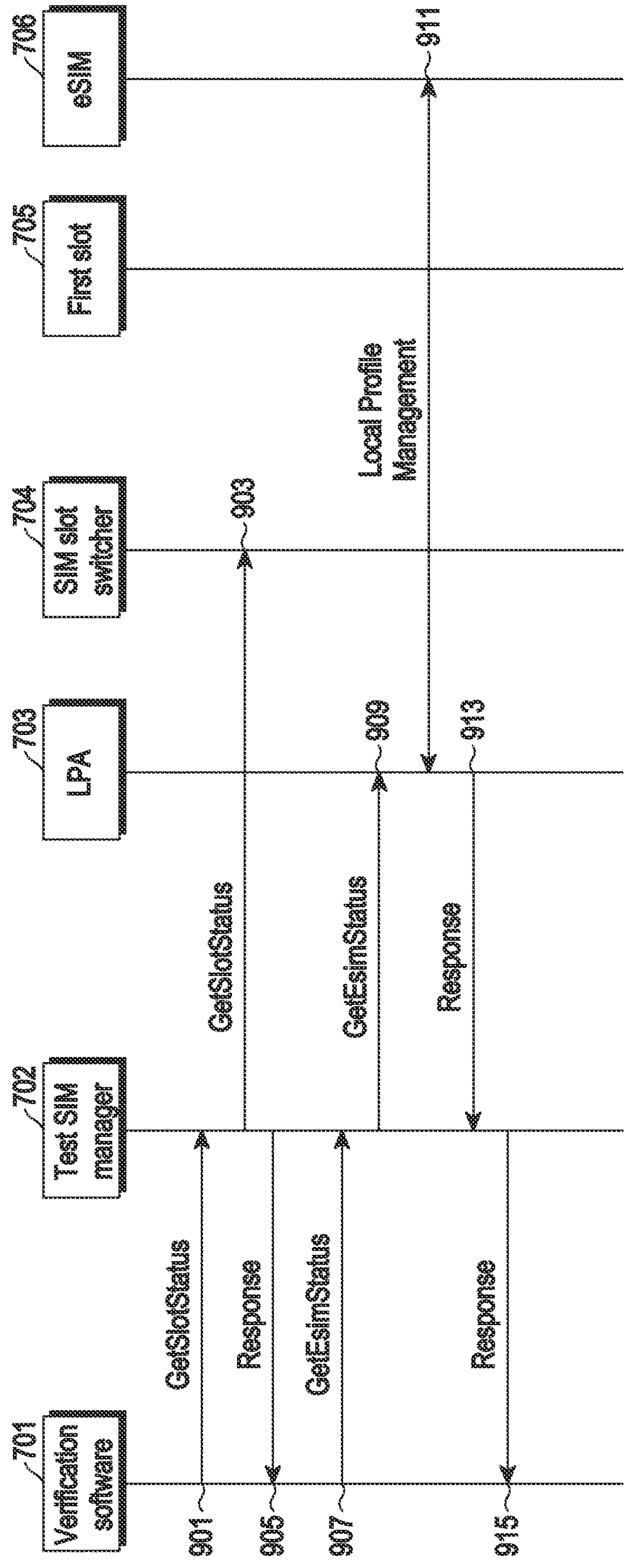
FIG. 9 is a flowchart illustrating a method of operating an electronic device according to an embodiment of the disclosure.

FIG. 9 is a flowchart illustrating a method of operating an electronic device according to an embodiment of the disclosure.

According to various embodiments, an electronic device 101 (e.g., a processor 120 and/or a CP 510) may identify the state of each of a plurality of slots (or ports), as described with reference to FIG. 8. For example, verification software 701 may provide a GetSlotStatus request to a test SIM manager 702 in operation 901. GetSlotStatus may be a procedure of obtaining information associated with a slot, and Table 3 is an example of the GetTestProfile procedure according to various embodiments.

TABLE 3

| Operation | Parameter name | Description | Type | MOC |
|---|---|---|---|---|
| Request | Slot | Number of slot whose state is to be identified | Integer | M |
| Response | OperationResult | Operation result | Integer | M |
| | Slot | Slot number | Integer | M |
| | Eid | Linked eSIM ID | String | C |
| | SimState | Current state of SIM card | Integer | M |
| | Iccid | ICCID of current enabled SIM card/profile | String | C |

In an example, the verification software 701 may provide the test SIM manager 702 with a request including a parameter (e.g., Slot) indicating the number of a slot whose state is to be identified. The test SIM manager 702 may provide a response to the verification software 701, and the response may include a parameter (e.g., operationResult) indicating an operation result, a parameter (e.g., slot) indicating a slot number, a parameter (e.g., Eid) indicating an eSIM ID linked to a slot, a parameter (e.g., SimState) indicating the state of a current SIM card, and/or a parameter (e.g., Iccid) indicating the ICCID of a current enabled SIM card/profile. In an embodiment, the parameter indicating an operation result may indicate, but not limited to, success or failure of the operation. In another embodiment, the test SIM manager 702 may provide the received GetSlotStatus request to the SIM slot switcher 704 in operation 903. In an example, when "slot=2", this may mean that SIM information connected to slot number 2 (or port number 2) is requested. Meanwhile, the parameter corresponding to "slot" in GetslotStatus may be exchanged with a parameter corresponding to a port. In another example, a slot number may be exchanged with a port number, and an eSIM lined to a specific slot may be understood as an eSIM linked to a specific port. In various embodiments, the electronic device 101 needs to specify a protocol stack to test the specific protocol stack, and those skilled in the art will understand that a slot number and/or a port number may be used as information specifying a protocol stack.

According to an embodiment, the SIM slot switcher 704 may control connection (or binding) between a plurality of slots (or ports) of the electronic device 101 and an eSIM in terms of hardware and/or software. According to another embodiment, the SIM slot switcher 704 may perform, for example, hardware switching and/or software association so that information of the eSIM may be used in a specific protocol stack, which may be referred to as connection (or association) between the eSIM and a slot, and/or connection (or association) between the eSIM and a port. According to yet another embodiment, the SIM slot switcher 704 may manage a connection (or association) relationship between the plurality of slots (or ports) of the electronic device 101 and at least one eSIM. The SIM slot switcher 704 may identify information about each slot (or port) based on the GetSlotStatus request. According to still another embodiment, the SIM slot switcher 704 may provide a response to GetSlotStatus to the test SIM manager 702. As shown in Table 3, the response to GetSlotStatus may include at least one of a slot number, identification information about a linked eSIM, the state of a current SIM card, or the ICCID of a current enabled SIM card/profile. The test SIM manager 702 may provide the response to GetSlotStatus to the verification software 701 in operation 905. For example, a response with "OperationResult=1", "slot=2", "Eid=89", "Simstate=0" may indicate that the operation is successful and that for slot number (or port number) 2, an eSIM with Eid=89 is connected (or associated) and the current state is the disabled state, which should not be construed as limiting.

According to various embodiments, the electronic device 101 (e.g., the processor 120 and/or the CP 510) may obtain eSIM information as described with reference to FIG. 8. In an example, the verification software 701 may provide a GetEsimStatus request to the test SIM manager 702 in operation 907. GetEsimStatus may be a procedure of obtaining information about an eSIM, and Table 4 is an example of the GetEsimStatus procedure according to various embodiments.

TABLE 4

| Operation | Parameter name | Description | Type | MOC |
|---|---|---|---|---|
| Request | Eid | eSIM ID whose state is to be identified | String | O |
| Response | OperationResult | Operation result | Integer | M |
| | EsimInfo | eSIM information | Array of eSIM Info | C |

In an example, the verification software 701 may provide the test SIM manager 702 with a request including a parameter (e.g., Eid) indicating identification information about an eSIM of which the information is to be identified. The test SIM manager 702 may provide a GetEsimStatus request to the LPA 703 in operation 909. A response to GetEsimStatus may include a parameter (e.g., OperationResult) indicating an operation result and/or a parameter (e.g., EsimInfo) indicating eSIM information.

The LPA 703 may, for example, perform local profile management based on the GetEsimStatus request in operation 911. According to an embodiment, the local profile management of operation 911 may be, for example, a function of requesting information associated with an eSIM from the eSIM 706 and obtaining the information. Table 5 is an example of the information associated with the eSIM.

TABLE 5

| Key | Description | Type | MOC |
|---|---|---|---|
| Eid | eSIM ID whose state is to be identified | String | M |

TABLE 5-continued

| Key | Description | Type | MOC |
|---|---|---|---|
| ProfileInfo | Profile information | Array of eSIM Info | C |

As shown in Table 5, the information associated with the eSIM, obtained based on local profile management by the LPA 703 in operation 911 may include eSIM identification information (e.g., an Eid key) and profile information (e.g., a ProfileInfo key). FIG. 6 is an example of the profile information.

TABLE 6

| Key | Description | Type | MOC |
|---|---|---|---|
| ICCID | ICCID | String | M |
| AID | Application ID | String | M |
| ProfileState | Profile state | Integer | M |
| ServiceProviderName | Service provider name | String | M |
| ProfileName | Profile name | String | M |
| IconType | Type of icon data | Integer | O |
| Icon | Icon data | Binary | O |

As shown in Table 6, the profile information may include profile identification information (e.g., an ICCID key and/or an Application ID key), information (e.g., a ProfileState key) indicating the state of the profile, information (e.g., a ServiceProviderName key) indicating the name of a service provider, a profile name (e.g., a ProfileName key), information (e.g., an IconType key) indicating the type of icon data, and/or icon data (e.g., an Icon key).

According to another embodiment, the LPA 703 may provide a response to GetEsimStatus to the test SIM manager 702 in operation 913. According to still another embodiment, the test SIM manager 702 may provide a response to GetEsimStatus to the verification software 701 in operation 915. The verification software 701 may identify information associated with the eSIM, for example, profile information based on the received response.

While not shown, the test SIM manager 702 may request information about a combination available for binding, which indicates a slot (or port) number, from the SIM slot switcher 704. In an embodiment the SIM slot switcher 704 may return information about an eSIM which may be connected on a slot (or port) number basis in response to the request. When the test SIM manager 702 does not specify a specific slot (or port), the SIM slot switcher 704 may return information about an eSIM that may be connected, for each of all slots (or ports).

Figure 10:
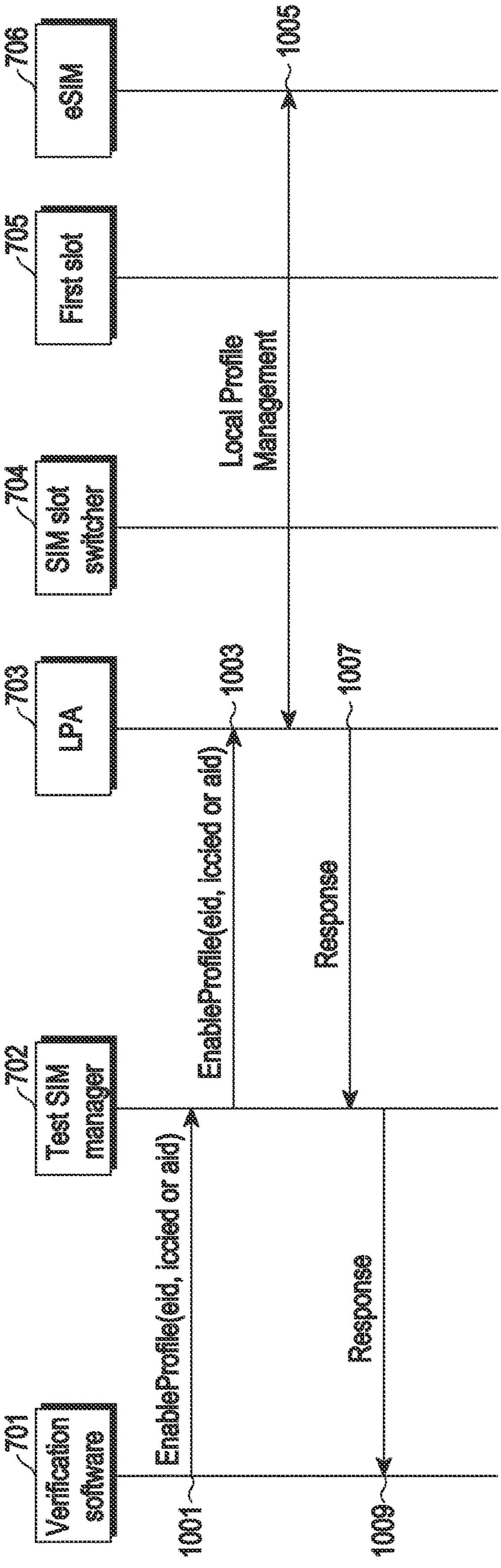
FIG. 10 is a flowchart illustrating a method of operating an electronic device according to an embodiment of the disclosure.

FIG. 10 is a flowchart illustrating a method of operating an electronic device according to an embodiment of the disclosure.

According to various embodiments, an electronic device 101 (e.g., a processor 120 and/or a CP 510) may write the first profile to the first eSIM and enable the first profile, as described with reference to FIG. 8. A detailed procedure of writing the first profile to the first eSIM may be performed, for example, according to FIG. 7A or FIG. 7B. To enable the written first profile, verification software 701 may provide an EnableProfile request to a test SIM manager 702 in operation 1001. EnableProfile may be a procedure of enabling a profile written to an eSIM, and Table 7 is an example of the EnableProfile procedure according to various embodiments.

TABLE 7

| Operation | Parameter name | Description | Type | MOC |
|---|---|---|---|---|
| Request | Eid | ID of eSIM with profile to be enabled | String | M |
| | iccid | iccid of profile | String | O |
| | Aid | aid of profile | String | O |
| Response | OperationResult | Operation result | Integer | M |

In an example, the verification software 701 may provide the test SIM manager 702 with an EnableProfile request including at least one of a parameter (e.g., Eid) indicating identification information about an eSIM (e.g., the eSIM 706) with a profile to be enabled, and identification information about the profile to be enabled, such as a parameter (e.g., iccid) indicating an iccid request or a parameter (e.g., aid) indicating an aid. In operation 1003, the test SIM manager 702 may provide the EnableProfile request to the LPA 703. In another example, when "Eid=89" and "ICCID=89123", this may mean that a profile with identification information "89123" is enabled in an eSIM with an eid of "89".

In an embodiment, the LPA 703 may perform local profile management based on the EnableProfile request in operation 1005. The local profile management of operation 1005 may be, for example, a function of enabling the first profile written to the eSIM 706. The eSIM 706 may enable the first profile based on the local profile management of the LPA 703. In another embodiment, the LPA 703 may identify whether the first profile of the eSIM 706 is enabled based on the execution of the local profile management. In still another embodiment, the LPA 703 may provide a response to EnableProfile to the test SIM manager 702 in operation 1007. As shown in Table 7, the response to EnableProfile may include an operation result. The test SIM manager 702 may identify whether the first profile written to the eSIM 706 has been enabled based on the response to EnableProfile. In yet another embodiment, the test SIM manager 702 may provide a response to EnableProfile to the verification software 701 in operation 1009. As shown in Table 7, the response to EnableProfile may include an operation result. The verification software 701 may identify whether the first profile written to the eSIM 706 has been enabled based on the response to EnableProfile.

Figure 11:
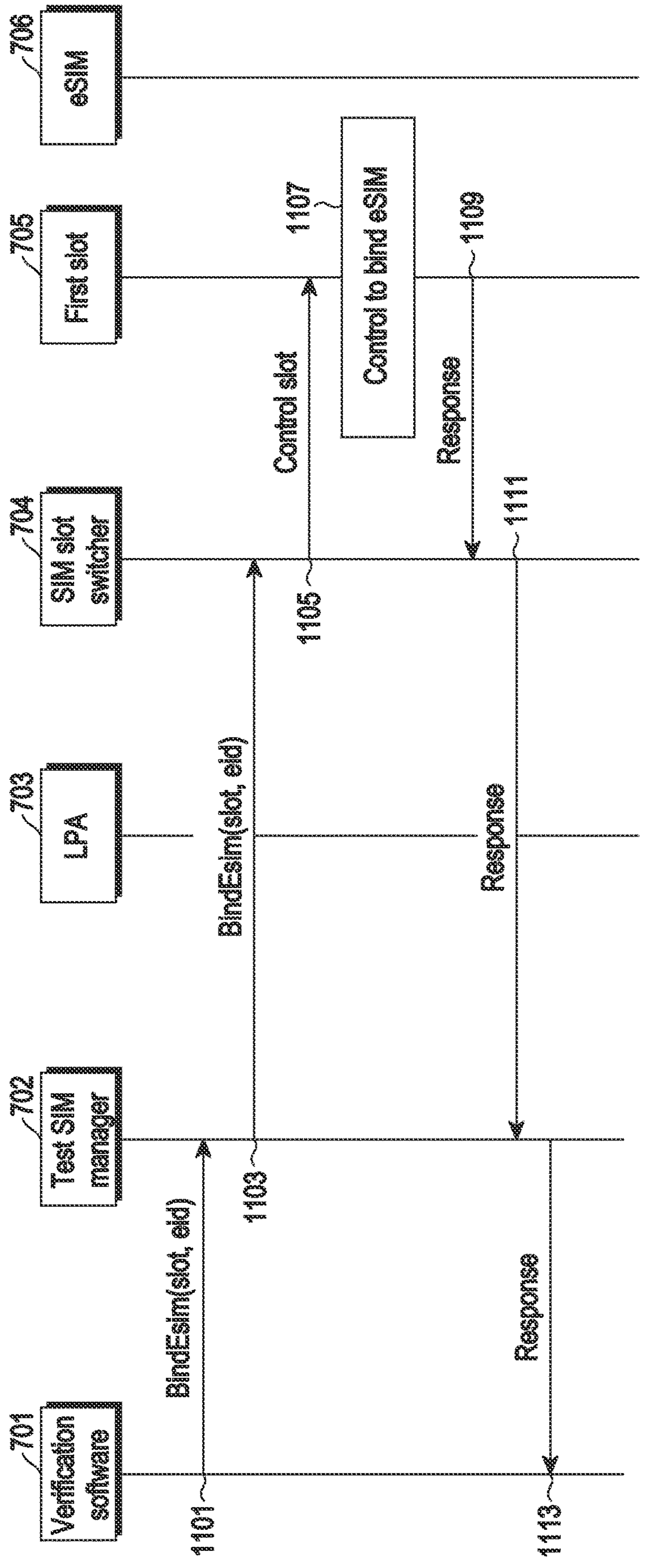
FIG. 11 is a flowchart illustrating a method of operating an electronic device according to an embodiment of the disclosure.

FIG. 11 is a flowchart illustrating a method of operating an electronic device according to an embodiment of the disclosure.

According to various embodiments, an electronic device 101 (e.g., a processor 120 and/or a CP 510) may perform an operation of connecting the first protocol stack for testing to the first eSIM, for example, an operation of binding the first slot to the first eSIM, as described with reference to FIG. 8. For example, the electronic device 101 may perform an operation of connecting the first eSIM to the first port (or the first slot). For example, to bind an eSIM 706 to a first slot 705 (or a first port), verification software 701 may provide a BindEsim request to the test SIM manager 702 in operation 1101. In an example, the verification software 701 may determine to perform a verification operation associated with the protocol stack corresponding to the first slot 705. The verification software 701 may identify the state of each slot (or port) based on, for example, the procedure of FIG. 9. For example, the verification software 701 may identify that the eSIM 706 is not bound to the first slot 705. Based on the eSIM 706 not being bound to the first slot 705, the verification software 701 may perform the procedure of FIG. 11 in which the eSIM 706 is bound to the first slot 705. When the eSIM 706 is bound to the first slot 705, the connection procedure of FIG. 11 may be omitted, or even when the eSIM 706 is connected to the first slot 705, the binding procedure of FIG. 11 may be performed.

BindEsim may be a procedure of connecting an eSIM to a specific slot, and Table 8 is an example of the BindEsim procedure according to various embodiments.

TABLE 8

| Operation | Parameter name | Description | Type | MOC |
|---|---|---|---|---|
| Request | Slot | Slot number | Integer | M |
| | Eid | eSIM ID to be connected | String | M |
| Response | OperationResult | Operation result | Integer | M |

The verification software 701 may, for example, provide the test SIM manager 702 with a BindEsim request including a parameter (e.g., slot) (or port number) indicating the number of a slot (e.g., the first slot 705) to be connected, and a parameter (e.g., Eid) indicating identification information about an eSIM (e.g., the eSIM 706) to be connected. In operation 1103, the test SIM manager 702 may provide a BindEsim request to the SIM slot switcher 704. For example, when “slot=2” and “Eid=89”, this may mean that slot number “2” (or port number) is bound to an eSIM with an eid of “89”.

According to some embodiments, the SIM slot switcher 704 may identify that the first slot 705 is to be bound to the eSIM 706 based on the received BindEsim request. The SIM slot switcher 704 may control the first slot 705 in operation 1105. In operation 1107, the first slot 705 may control to bind the eSIM 706 to the first slot 705. The first slot 705 may provide a response indicating a connection control result to the SIM slot switcher 704. In FIG. 11, the SIM slot switcher 704 is shown as controlling the first slot 705 so that the first slot 705 performs an operation for connection. In various embodiments, the electronic device 101 may include an entity (e.g., the switch 560) capable of controlling a connection state between ports (or slots) and the eSIM in terms of hardware, and operations 1105, 1107, and 1109 may be understood to be performed by the entity (e.g., the switch 560). Alternatively, the electronic device 101 (e.g., the CP 510) may, for example, control the first profile enabled in the eSIM 706 to be used for an operation associated with the protocol stack corresponding to the first slot 705. In this case, it may be understood that operations 1105, 1107, and 1109 are performed by the CP 510. However, the above-described operation entity is also illustrative. The entity performing the operation of connecting the eSIM 706 to the first slot 705 is not limited, and those skilled in the art will understand that the operation may be performed in terms of software and/or hardware.

According to other embodiments, the SIM slot switcher 704 may provide a response to BindEsim to the test SIM manager 702 in operation 1111. As shown in Table 8, the response to BindEsim may include an operation result. The test SIM manager 702 may identify whether the eSIM 706 is bound to the first slot 705 based on the response to BindEsim. The test SIM manager 702 may provide a response to BindEsim to the verification software 701 in operation 1113. As shown in Table 8, the response to BindEsim may include an operation result. The verification software 701 may identify whether the eSIM 706 is bound to the first slot 705 based on the response to BindEsim.

In an embodiment, the verification software 701 may perform a verification operation associated with the protocol stack corresponding to the slot 705 (or the first port), using the first profile enabled in the eSIM 706, based on the binding of the eSIM 706 to the first slot 705 (or port).

Figure 12:
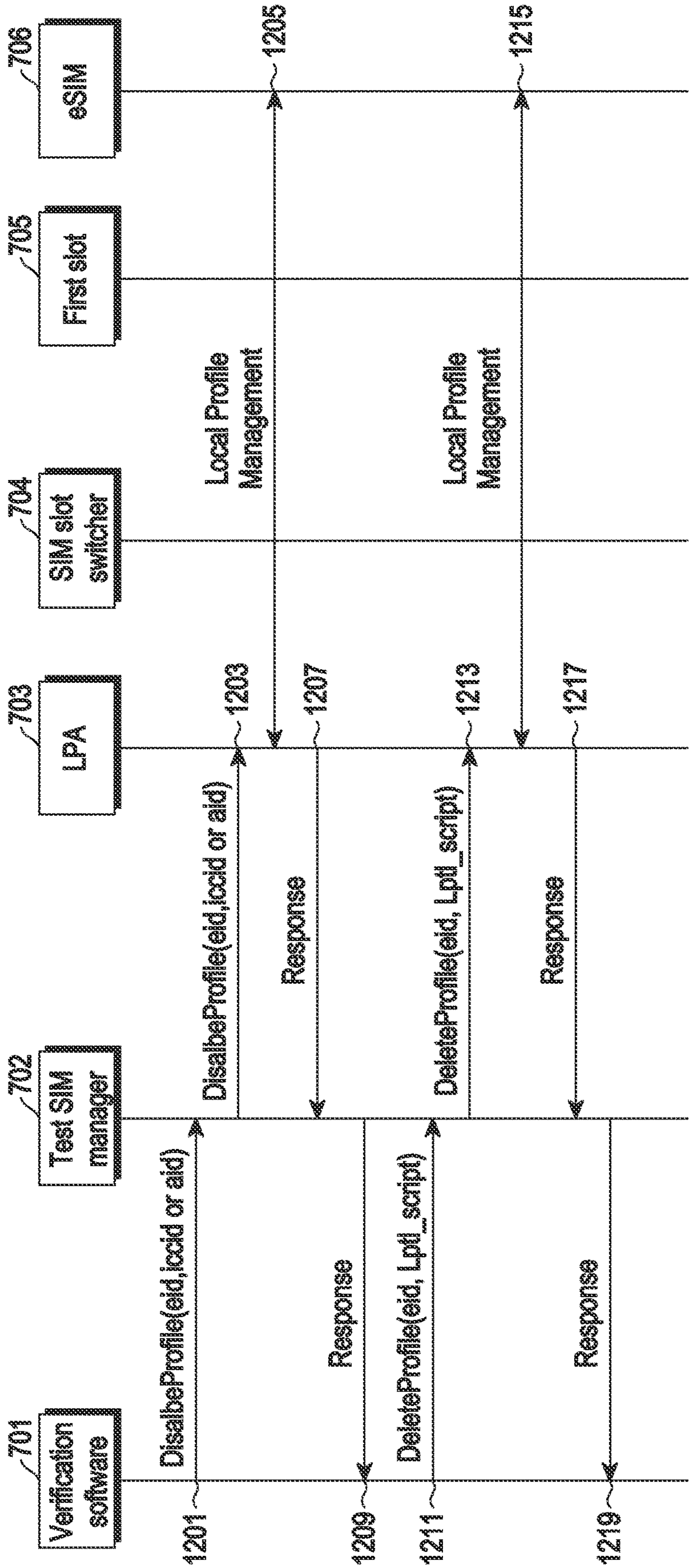
FIG. 12 is a flowchart illustrating a method of operating an electronic device according to an embodiment of the disclosure.

FIG. 12 is a flowchart illustrating a method of operating an electronic device according to an embodiment of the disclosure.

According to various embodiments, an electronic device 101 (e.g., a processor 120 and/or a CP 510) may disable and delete the first profile as described with reference to FIG. 8. For example, to disable the first profile enabled in an eSIM 706, verification software 701 may provide a DisableProfile request to the test SIM manager 702 in operation 1201. For example, the verification software 701 may determine to complete the verification operation using the first profile enabled in the first slot 705 and the eSIM 706 and disable the first profile. DisableProfile may be a procedure of disabling a profile enabled in an eSIM, and Table 9 is an example of the DisableProfile procedure according to various embodiments.

TABLE 9

| Operation | Parameter name | Description | Type | MOC |
|---|---|---|---|---|
| Request | Eid | eSIM ID with profile to be disabled | String | M |
| | iccid | iccid of profile | String | O |
| | aid | aid of profile | String | O |
| Response | OperationResult | Operation result | Integer | M |

In an example, the verification software 701 may provide the test SIM manager 702 with a DisableProfile request including a parameter (e.g., Eid) indicating identification information about an eSIM (e.g., the eSIM 706) to which a profile to be disabled was written, and identification information about the profile to be disabled, for example, a parameter (e.g., iccid) indicating an iccid or a parameter (e.g., aid) indicating an aid. In operation 1203, the test SIM manager 702 may provide a DisableProfile request to the LPA 703. In another example, when “Eid=89” and “ICCID=89123”, this may mean that a profile with identification information “89123” in an eSIM with an eid of “89” is disabled.

According to an embodiment, the LPA 703 may perform local profile management based on the DisableProfile request in operation 1205. The local profile management of operation 1205 may be, for example, a function of disabling the first profile written to the eSIM 706. The eSIM 706 may disable the first profile based on the local profile management of the LPA 703. According to another embodiment, the LPA 703 may identify whether the first profile of the eSIM 706 is disabled based on the execution of the local profile management. According to still another embodiment, the LPA 703 may provide a response to DisableProfile to the test SIM manager 702 in operation 1207. As shown in Table 9, the response to DisableProfile may include an operation result. The test SIM manager 702 may identify whether the first profile written to the eSIM 706 has been disabled based on the response to DisableProfile. The test SIM manager 702 may, for example, provide a response to DisableProfile to the verification software 701 in operation 1209. As shown in Table 9, the response to DisableProfile may include an operation result. The verification software 701 may identify whether the first profile written to the eSIM 706 has been disabled based on the response to DisableProfile.

The verification software 701 may provide a DeleteProfile request to the test SIM manager 702 to delete the first profile enabled in the eSIM 706 in operation 1211. In an example, the verification software 701 may determine to delete the first profile based on the identification that the first profile has been disabled. Depending on implementation, the electronic device 101 may directly delete the first profile without performing the procedure of disabling the first profile. DeleteProfile may be a procedure of deleting a profile enabled in an eSIM, and Table 10 is an example of the DeleteProfile procedure according to various embodiments.

TABLE 10

| Operation | Parameter name | Description | Type | MOC |
|---|---|---|---|---|
| Request | Eid | eSIM ID with profile to be deleted | String | M |
| | iccid | iccid of profile | String | O |
| | aid | aid of profile | String | O |
| Response | OperationResult | Operation result | Integer | M |

In an example, the verification software 701 may provide the test SIM manager 702 with a DeleteProfile request including a parameter (e.g., Eid) indicating identification information about an eSIM (e.g., the eSIM 706) to which a profile to be deleted is written, and identification information about the profile to be disabled, for example, a parameter (e.g., iccid) indicating an iccid or a parameter (e.g., aid) indicating an aid. In operation 1213, the test SIM manager 702 may provide a DeleteProfile request to the LPA 703. In another example, when "Eid=89" and "ICCID=89123", this may mean that a profile with identification information "89123" is deleted from an eSIM with an eid of "89".

In an embodiment, the LPA 703 may perform local profile management based on the DeleteProfile request in operation 1215. The local profile management of operation 1215 may be, for example, a function of deleting the first profile written to the eSIM 706. The eSIM 706 may delete the first profile based on the local profile management of the LPA 703. The LPA 703 may identify whether the first profile of the eSIM 706 has been deleted based on the execution of the local profile management. In another embodiment, the LPA 703 may provide a response to DeleteProfile to the test SIM manager 702 in operation 1217. As shown in Table 10, the response to DeleteProfile may include an operation result. In yet another embodiment, the test SIM manager 702 may identify whether the first profile written to the eSIM 706 has been deleted based on the response to DeleteProfile. In still another embodiment, the test SIM manager 702 may provide a response to DeleteProfile to the verification software 701 in operation 1219. As shown in Table 10, the response to DeleteProfile may include an operation result. The verification software 701 may identify whether the first profile written to the eSIM 706 has been deleted based on the response to DeleteProfile.

Figure 13:
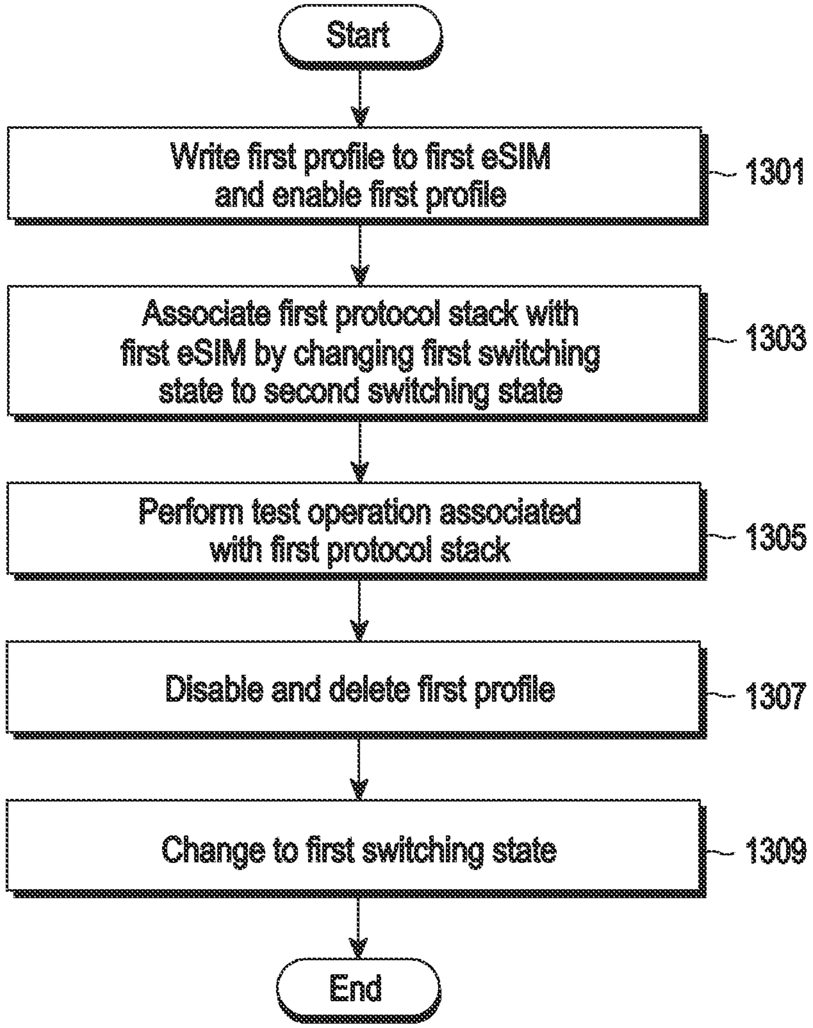
FIG. 13 is a flowchart illustrating a method of operating an electronic device according to an embodiment of the disclosure.

FIG. 13 is a flowchart illustrating a method of operating an electronic device according to an embodiment of the disclosure.

According to various embodiments, an electronic device 101 (e.g., a processor 120 and/or a CP 510) may write the first profile to the first eSIM and enable the first profile in operation 1301. For example, the electronic device 101 may write the first profile to the first eSIM based on the procedure of FIG. 7A or 7B. For example, the electronic device 101 may enable the first profile based on the procedure of FIG. 10.

In operation 1303, the electronic device 101 may connect (e.g., bind) the first eSIM to the first slot by changing a first switching state to a second switching state. The electronic device 101 may, for example, determine to perform a verification operation associated with the protocol stack corresponding to the first slot. The first switching state may be, for example, a default state or a state after a previous verification operation is performed, and the first eSIM may not be connected to the first slot in the first switching state. In another embodiment, the electronic device 101 may change the first switching state to the second switching state in which the first eSIM is connected to the first slot. In the second switching state, the first eSIM may be connected (e.g., bound) to the first slot. Changing the switching state may mean controlling to connect a specific eSIM to a specific slot in terms of hardware and/or controlling information stored in a specific eSIM to be used in a protocol stack corresponding to a specific slot in terms of software. For example, the electronic device 101 may change the switching state based on the procedure of FIG. 11.

In operation 1305, the electronic device 101 may perform a test operation associated with the first port. For example, the electronic device 101 may perform a verification operation associated with the protocol stack corresponding to the first slot by using the first profile enabled in the first eSIM. When the verification operation is completed, the electronic device 101 may disable and delete the first profile in operation 1307. The electronic device 101 may, for example, disable and delete the first profile based on the procedure of FIG. 12. When the first profile is completely disabled and deleted, the electronic device 101 may change the second switching state to the first switching state in operation 1309. For example, when the first switching state is set as the default state, the electronic device 101 may change the second switching state to the first switching state to return to the default state based on the completion of the verification operation associated with the first port. Return of the switching state will be described with reference to FIG. 14. In another embodiment, the electronic device 101 may determine to perform a verification operation associated with the second port. The electronic device 101 may change the second switching state to a third switching state in which the second slot is connected to the first eSIM.

Figure 14:
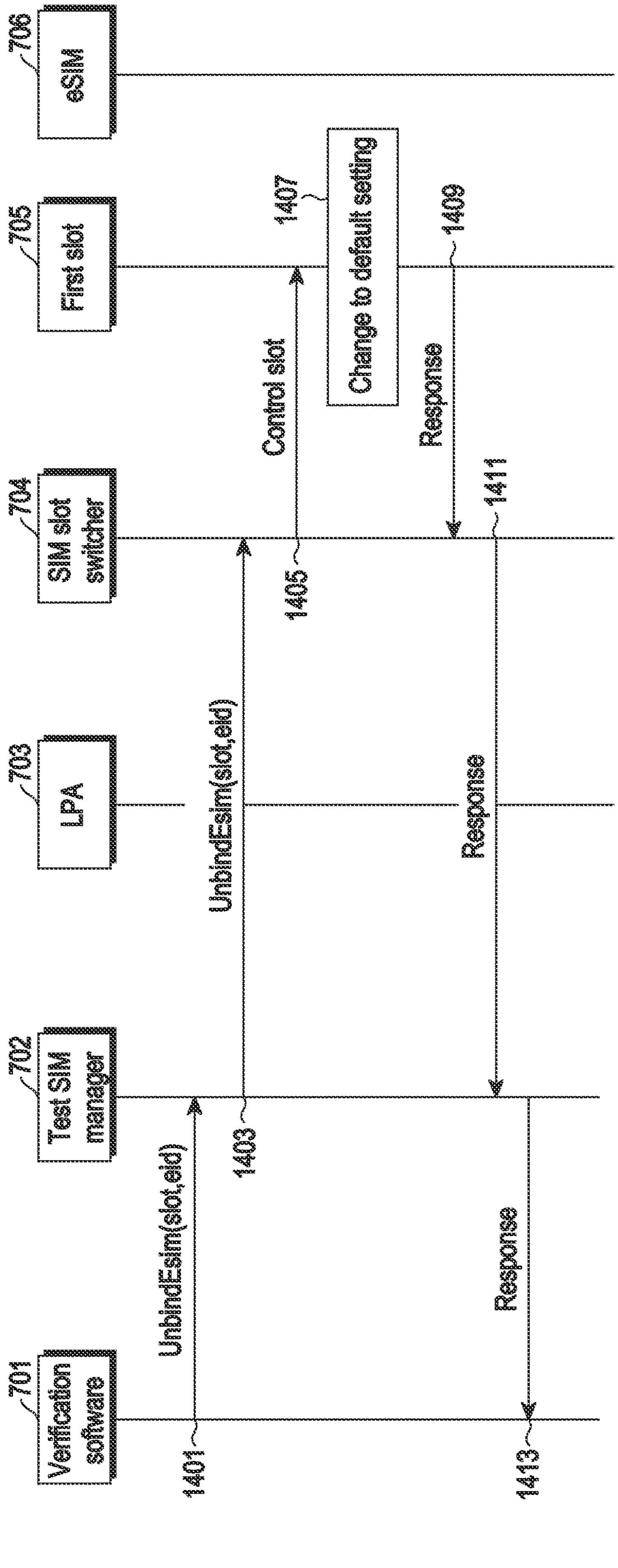
FIG. 14 is a flowchart illustrating a method of operating an electronic device according to an embodiment of the disclosure.

FIG. 14 is a flowchart illustrating a method of operating an electronic device according to an embodiment of the disclosure.

According to various embodiments, an electronic device 101 (e.g., a processor 120 and/or a CP 510) may release a connection between a specific slot and an eSIM. For example, to release the connection between an eSIM 706 and a first slot 705, verification software 701 may provide an UnbindEsim request to a test SIM manager 702 in operation 1401. For example, it is assumed that the eSIM 706 is connected (or bound) to the first slot 705 based on the procedure of FIG. 11. The verification software 701 may identify that the verification operation associated with the protocol stack corresponding to the first slot 705 has been completed. UnbindEsim may be a procedure of releasing a connection between an eSIM and a specific slot, and Table 11 is an example of the UnbindEsim procedure according to various embodiments.

TABLE 11

| Operation | Parameter name | Description | Type | MOC |
|---|---|---|---|---|
| Request | slot | Slot number | Integer | M |
| | Eid | eSIM ID to be disconnected | String | M |
| Response | OperationResult | Operation result | Integer | M |

In an example, the verification software 701 may provide the test SIM manager 702 with an UnbindEsim request including a parameter (e.g., slot) indicating the number of a slot (e.g., the first slot 705) to be connected, and a parameter (e.g., Eid) indicating identification information an eSIM (e.g., the eSIM 706) to be connected. In operation 1403, the test SIM manager 702 may provide an UnbindEsim request to the SIM slot switcher 704. In another example, when "slot=2" and "Eid=89", this may mean that an eSIM "89" is disconnected from slot number (or port number) "2".

The SIM slot switcher 704 may identify that the connection between the first slot 705 and the eSIM 706 is to be released, based on the received UnbindEsim request. The SIM slot switcher 704 may control the first slot 705 in operation 1405. In operation 1407, the first slot 705 may control to release the connection between the eSIM 706 and the first slot 705 (or port). The first slot 705 may provide a response indicating a result of the connection release control to the SIM slot switcher 704. The SIM slot switcher 704 is shown in FIG. 14 as performing an operation of disconnecting the first slot 705 by controlling the first slot 705. In some embodiments, the electronic device 101 may include an entity (e.g., the switch) capable of controlling a connection state between ports (or slots) and the eSIM in terms of hardware, and operations 1405, 1407, and 1409 may be understood to be performed by the entity. Alternatively, the electronic device 101 (e.g., the CP 510) may control the first profile enabled in the eSIM 706 to be used no longer for an operation associated with the protocol stack corresponding to the first slot 705. In this case, it may be understood that operations 1405, 1407, and 1409 are performed by the CP 510. However, the above-described operation entity is also illustrative. The entity performing the operation of releasing the connection between the eSIM 706 and the first slot 705 is not limited, and those skilled in the art will understand that the operation may be performed in terms of software and/or hardware.

In an embodiment, the SIM slot switcher 704 may provide a response to UnbindEsim to the test SIM manager 702 in operation 1411. As shown in Table 11, the response to UnbindEsim may include an operation result. The test SIM manager 702 may identify whether the connection between the eSIM 706 and the first slot 705 has been released based on the response to UnbindEsim. In another embodiment, the test SIM manager 702 may provide a response to UnbindEsim to the verification software 701 in operation 1413. As shown in Table 11, the response to UnbindEsim may include an operation result. The verification software 701 may identify whether the connection between the eSIM 706 and the first slot 705 has been released based on the response to UnbindEsim.

Figure 15:
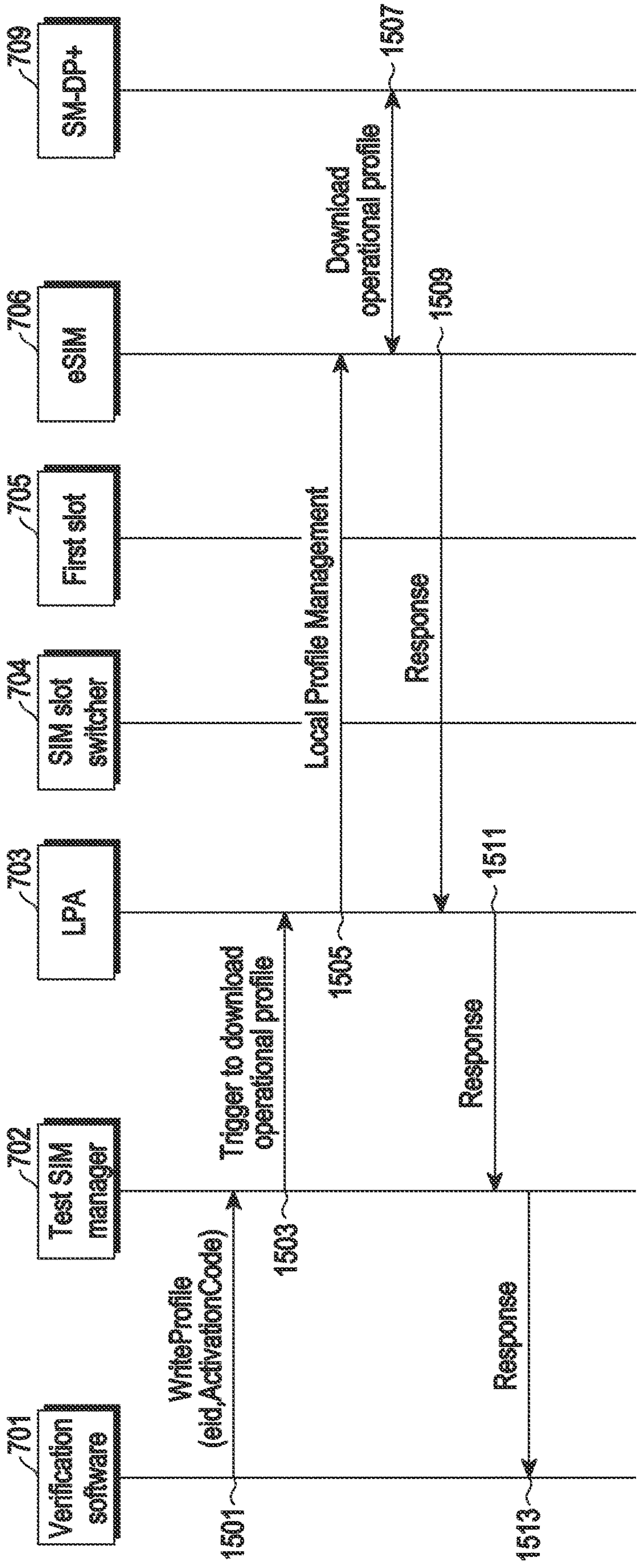
FIG. 15 is a flowchart illustrating a method of operating an electronic device according to an embodiment of the disclosure.

FIG. 15 is a flowchart illustrating a method of operating an electronic device according to an embodiment of the disclosure.

According to various embodiments, verification software 701 may provide a WriteProfile request, which is a command to write a profile for testing, to a test SIM manager 702 in operation 1501. For example, the WriteProfile request may include a parameter indicating identification information (e.g., eid) about an eSIM and a parameter (e.g., ActivationCode) indicating an activation code. In operation 1503, the test SIM manager 702 may trigger download of an operational profile to an LPA 703 based on the WriteProfile request. The LPA 703 may perform local profile management in operation 1505. The local profile management of operation 1507 may be, for example, downloading the operational profile from the SM DP+ server 709 by the eSIM 706. The eSIM 706 may download the operational profile from the SM DP+ server 709 based on the local profile management in operation 1507. The eSIM 706 may provide a response to the local profile management to the LPA 703 in operation 1509, and the response may include an operation result. Based on the received response, the LPA 703 may identify whether the download of the operational profile to the eSIM 06 is successful. In another embodiment, the LPA 703 may provide a response to the trigger to the test SIM manager 702 in operation 1511. The response to the trigger may include an operation result. Based on the received response, the test SIM manager 702 may identify whether the download of the operational profile is successful. The test SIM manager 702 may provide a response to WriteProfile to the verification software 701 in operation 1513. The response to WriteProfile may include an operation result. In yet another embodiment, the verification software 701 may identify whether the download of the operational profile is successful based on the received response.

The electronic device 101 according to various embodiments may perform a test using the operational profile received from the SM DP+ server 220 rather than a profile stored in the electronic device 101 and/or the external device 600. In another embodiment, the electronic device 101 may enable the operational profile. The electronic device 101 may perform a hardware and/or software switching operation to associate the eSIM 706 with a protocol stack for testing. In still another embodiment, the electronic device 101 may perform the test and then disable and delete the operational profile. The electronic device 101 is shown in FIG. 15 as using the operational profile from the SM-DP+ server 220 in the test, and the electronic device 101 may download a test profile from the SM-DP+ server 220 and use the test profile in the test.

According to some embodiments, an electronic device may include at least one processor and at least one eSIM. The at least one processor may be configured to identify an eSIM for a test among the at least one eSIM, obtain a profile to be written to the eSIM from memory of the electronic device and/or an external device other than an SM-DP+ server, write the profile to the eSIM, enable the profile, perform an operation of associating a protocol stack corresponding to a port for the test among a plurality of ports associated with the at least one processor with the eSIM, perform a test operation using the profile and the protocol stack associated with the eSIM, and disable the profile and delete the profile, based on completion of the test operation.

According to other embodiments, the electronic device may further include a switch configured to selectively connect the plurality of ports and the eSIM to each other. The at least one processor may be configured to, as at least a part of performing the operation of associating the protocol stack corresponding to the port for the test with the eSIM, control the switch to connect the eSIM to the port for the test.

According to an embodiment, the at least one processor may be configured to, as at least a part of performing the operation of associating the protocol stack corresponding to the port for the test with the eSIM, associate the profile enabled in the eSIM with the protocol stack.

According to another embodiment, the at least one processor may be further configured to identify a state of each of the plurality of ports.

According to yet another embodiment, the at least one processor may be further configured to identify information of the at least one eSIM based on the state of each of the plurality of ports.

According to still another embodiment, the at least one processor may be configured to, as at least a part of performing the operation of associating the protocol stack corresponding to the port for the test among the plurality of ports associated with the at least one processor with the eSIM, perform the operation of associating the protocol stack corresponding to the port for the test with the eSIM, based on identifying the protocol stack corresponding to the port for the test not being associated with the eSIM based on the state of each of the plurality of ports.

In an embodiment, the state of each of the plurality of ports may include at least one of an identification number of each of the plurality of ports, identification information about an eSIM connected to each of the plurality of ports, state information about the eSIM connected to each of the plurality of ports, or identification information about an enabled SIM card or profile.

In another embodiment, the at least one processor may be configured to, as at least a part of identifying the eSIM for the test among the at least one eSIM, identify identification information about the eSIM and/or information about an existing profile written in the eSIM.

In yet another embodiment, at least one of writing the profile to the eSIM, enabling the profile, disabling the profile, or deleting the profile may be performed based on the identification information about the eSIM and identification information about the profile.

In still another embodiment, the at least one processor may be further configured to release the association between the protocol stack corresponding to the port for the test and the eSIM, after disabling the profile and deleting the profile.

According to various embodiments, a method of operating an electronic device including at least one eSIM may include identifying an eSIM for a test among the at least one eSIM, obtaining a profile to be written to the eSIM from memory of the electronic device and/or an external device other than an SM-DP+ server, writing the profile to the eSIM, enabling the profile, performing an operation of associating a protocol stack corresponding to a port for the test among a plurality of ports associated with the at least one processor with the eSIM, performing a test operation using the profile and the protocol stack associated with the eSIM, and disabling the profile and deleting the profile, based on completion of the test operation.

According to other embodiments, performing the operation of associating the protocol stack corresponding to the port for the test with the eSIM may include controlling a switch configured to selectively connect the plurality of ports and the eSIM to each other to connect the eSIM to the port for the test.

According to still other embodiments, performing the operation of associating the protocol stack corresponding to the port for the test with the eSIM may include associating the profile enabled in the eSIM with the protocol stack.

In an embodiment, the method may further include identifying a state of each of the plurality of ports.

In another embodiment, the method may further include identifying information of the at least one eSIM based on the state of each of the plurality of ports.

In yet another embodiment, performing the operation of associating the protocol stack corresponding to the port for the test among the plurality of ports associated with the at least one processor with the eSIM may include performing the operation of associating the protocol stack corresponding to the port for the test with the eSIM, based on identification that the protocol stack corresponding to the port for the test is not associated with the eSIM based on the state of each of the plurality of ports.

In still another embodiment, the state of each of the plurality of ports may include at least one of an identification number of each of the plurality of ports, identification information about an eSIM connected to each of the plurality of ports, state information about the eSIM connected to each of the plurality of ports, or identification information about an enabled SIM card or profile.

According to an embodiment, identifying the eSIM for the test among the at least one eSIM may include identifying identification information about the eSIM and/or information about an existing profile used in the eSIM, and at least one of writing the profile to the eSIM, enabling the profile, disabling the profile, or deleting the profile may be performed based on the identification information about the eSIM and identification information about the profile.

According to another embodiment, the method may further include releasing the association between the protocol stack corresponding to the port for the test and the eSIM, after disabling the profile and deleting the profile.

According to still another embodiment, an electronic device may include at least one processor and at least one eSIM. The at least one processor may be configured to identify an eSIM for a test among the at least one eSIM, obtain a profile to be written to the eSIM from an SM-DP+ server, write the profile to the eSIM, enable the profile, perform an operation of associating a protocol stack corresponding to a port for the test among a plurality of ports associated with the at least one processor with the eSIM, perform a test operation using the profile and the protocol stack associated with the eSIM, and disable the profile and delete the profile, based on completion of the test operation.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B, "at least one of A and B, "at least one of A or B, "A, B, or C, "at least one of A, B, and C, and "at least one of A, B, or C, may include any one of, or all possible combinations of the items enumerated together in a corresponding one of the phrases. As used herein, such terms as "1$^{st}$" and "2$^{nd}$, or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). In an example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to another embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to still another embodiment, each component (e.g., a module or a program) of the above-described components may include a single entity or multiple entities, and some of the multiple entities may be separately disposed in different components. According to some embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to other embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A non-transitory computer-readable storage medium recorded with instructions executable by an electronic device including at least one embedded subscriber identity module (eSIM), the instructions, when executed, causing the electronic device to perform operations comprising:

obtaining a test profile to be written to the at least one eSIM for a test operation from memory of the electronic device or an external device other than a subscription manager data preparation plus, SM-DP+, server, wherein the test profile is different from an operational profile that is to be obtained from the SM-DP+server, and the test profile includes subscriber identification information for communication with a network, and wherein the test operation includes at least one of a call operation and a data communication operation;

writing the test profile for the test operation to the at least one eSIM, and enabling the test profile;

associating a protocol stack corresponding to a port selected from a plurality of ports of at least one processor of the electronic device, for the test operation of the selected port, with the eSIM;

performing the test operation using the test profile and the protocol stack corresponding to the port; and disabling the test profile and deleting the test profile, based on completion of the test operation.

2. The non-transitory computer-readable storage medium of claim 1, wherein the associating of the protocol stack with the eSIM comprises:

controlling a switch configured to selectively connect a plurality of ports and the at least one eSIM to each other to connect the at least one eSIM to the port for the test.

3. The non-transitory computer-readable storage medium of claim 1, wherein the operations further comprise:

identifying a state of each of a plurality of ports.

4. The non-transitory computer-readable storage medium of claim 3, wherein the operations further comprise:

identifying information of the at least one eSIM based on the state of each of the plurality of ports.

5. The non-transitory computer-readable storage medium of claim 3, wherein the associating of the protocol stack with the eSIM comprises:

performing the operation of associating the protocol stack with the eSIM, based on identifying the protocol stack corresponding to the port for the test not being associated with the at least one eSIM based on the state of each of the plurality of ports.

6. The non-transitory computer-readable storage medium of claim 3, wherein the state of each of the plurality of ports includes at least one of an identification number of each of the plurality of ports, identification information about an eSIM connected to each of the plurality of ports, state information about the eSIM connected to each of the plurality of ports, or identification information about an enabled SIM card or profile.

7. The non-transitory computer-readable storage medium of claim 1, wherein the operations further comprise:

performing the operation of identifying the at least one eSIM for the test among the at least one eSIM by identifying identification information about the at least one eSIM or information about an existing profile written in the at least one eSIM.

8. The non-transitory computer-readable storage medium of claim 7, wherein at least one of writing the profile to the at least one eSIM, enabling the profile, disabling the profile, or deleting the profile is performed based on the identification information about the at least one eSIM and identification information about the profile.

9. The non-transitory computer-readable storage medium of claim 1, wherein the operations further comprise:

releasing an association between a protocol stack corresponding to a port for the test and the at least one eSIM, after disabling the test profile and deleting the test profile.

10. A method of operating an electronic device including at least one embedded subscriber identity module (eSIM), the method comprising:

obtaining a test profile to be written to the at least one eSIM for a test operation from memory of the electronic device or an external device other than a subscription manager data preparation plus, SM-DP+, server, wherein the test profile is different from an operational profile that is to be obtained from the SM-DP+server, and the test profile includes subscriber identification information for communication with a network, and wherein the test operation includes at least one of a call operation and a data communication operation;

writing the test profile for the test operation to the at least one eSIM, and enabling the test profile;

associating a protocol stack corresponding to a port selected from a plurality of ports of at least one processor of the electronic device, for the test operation of the selected port, with the eSIM;

performing the test operation using the test profile and the protocol stack corresponding to the port; and disabling the test profile and deleting the test profile, based on completion of the test operation.

11. The method of claim 10, wherein the associating the protocol stack with the eSIM comprises:

controlling a switch configured to selectively connect a plurality of ports and the at least one eSIM to each other to connect the at least one eSIM to the port for the test.

12. The method of claim 11, the method further comprising:

identifying a state of each of a plurality of ports.

13. The method of claim 12, the method further comprising:

identifying information of the at least one eSIM based on the state of each of the plurality of ports.

14. The method of claim 12, wherein the associating of the protocol stack with the eSIM comprises:

performing the operation of associating the protocol stack with the eSIM, based on identifying the protocol stack corresponding to the port for the test not being associated with the at least one eSIM based on the state of each of the plurality of ports.

15. The method of claim 12, wherein the state of each of the plurality of ports includes at least one of an identification number of each of the plurality of ports, identification information about an eSIM connected to each of the plurality of ports, state information about the eSIM connected to each of the plurality of ports, or identification information about an enabled SIM card or profile.

16. The method of claim 11, wherein the performing of the operation of identifying the at least one eSIM for the test among the at least one eSIM comprises:

identifying identification information about the at least one eSIM or information about an existing profile written in the at least one eSIM.

17. The method of claim 16, wherein at least one of writing the profile to the at least one eSIM, enabling the profile, disabling the profile, or deleting the profile is performed based on the identification information about the at least one eSIM and identification information about the profile.

18. The method of claim 11, wherein the method further comprises:

releasing an association between a protocol stack corresponding to a port for the test and the at least one eSIM, after disabling the test profile and deleting the test profile.

* * * * *